US006804658B2

(12) United States Patent
Lim et al.

(10) Patent No.: US 6,804,658 B2
(45) Date of Patent: Oct. 12, 2004

(54) METHOD AND SYSTEM FOR ORIGIN-DESTINATION PASSENGER DEMAND FORECAST INFERENCE

(75) Inventors: Alvin Lim, Riverdale, GA (US); John Blankenbaker, Atlanta, GA (US); Andrew David, Atlanta, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 0 days.

(21) Appl. No.: 10/313,556

(22) Filed: Dec. 6, 2002

(65) Prior Publication Data

US 2003/0115093 A1 Jun. 19, 2003

Related U.S. Application Data

(60) Provisional application No. 60/341,442, filed on Dec. 14, 2001.

(51) Int. Cl.[7] .............................................. G06F 17/60
(52) U.S. Cl. ............................................ 705/10; 705/6
(58) Field of Search ................................ 705/5, 6, 10

(56) References Cited

U.S. PATENT DOCUMENTS

| | | | | | |
|---|---|---|---|---|---|
| 5,255,184 | A | * | 10/1993 | Hornick et al. ................. | 705/6 |
| 5,832,453 | A | * | 11/1998 | O'Brien ............................ | 705/6 |
| 5,897,620 | A | * | 4/1999 | Walker et al. ................... | 705/5 |
| 5,918,209 | A | * | 6/1999 | Campbell et al. ............... | 705/5 |
| 6,085,164 | A | * | 7/2000 | Smith et al. ..................... | 705/5 |
| 6,085,169 | A | * | 7/2000 | Walker et al. ................... | 705/26 |
| 6,263,315 | B1 | * | 7/2001 | Talluri ............................. | 705/8 |
| 6,336,097 | B1 | * | 1/2002 | Scipioni .......................... | 705/6 |
| 6,418,413 | B2 | * | 7/2002 | DeMarcken et al. ........... | 705/5 |
| 2001/0044788 | A1 | * | 11/2001 | Demir et al. .................... | 705/400 |
| 2002/0161689 | A1 | * | 10/2002 | Segal .............................. | 705/37 |
| 2002/0178034 | A1 | * | 11/2002 | Gardner et al. ................. | 705/5 |
| 2003/0014288 | A1 | * | 1/2003 | Clarke et al. ................... | 705/7 |
| 2003/0065542 | A1 | * | 4/2003 | Gliozzi et al. .................. | 705/7 |

FOREIGN PATENT DOCUMENTS

| WO | WO 02/06923 A2 | * | 1/2002 |
|---|---|---|---|
| WO | WO 02/37211 A2 | * | 5/2002 |

OTHER PUBLICATIONS

Weatherford et al. "Forecasting for Hotel Revenue Management." Cornell Hotel and Restaurant Administration Quarterly, pp. 53–64, Aug. 2001.*

Weatherford, Lawrence R. "Length of Stay Heuristics." Cornell Hotel and Restaurant Administration Quarterly, pp. 70–79, Dec. 1995.*

Kimes, Sheryl E. & Kelly A. McGuire. "Function–space Revenue Management." Cornell Hotel and Restaurant Administration Quarterly, pp. 33–46, Dec. 2001.*

H. Bar–Gera, *Origin–Based Algorithms for Transportation Network Modeling*, Technical Report No. 103, National Institute of Statistical Sciences, Research Triangle Park, NC, Oct., 1999.

E. Cascetta, *Estimation of Trip Matrices from Traffic Counts and Survey Data: A Generalized Least Squares Estimator*, Transportation Research B, 18 (1984), pp. 289–299.

(List continued on next page.)

Primary Examiner—Susanna Meinecke-Díaz
(74) Attorney, Agent, or Firm—King & Spalding LLP

(57) ABSTRACT

An airline origin-destination revenue management software system supports decisions to accept or deny request for booking on airline seats by comparing the fare for the request with a minimum acceptable fare predetermined by the system. In order to determine the minimum acceptable fare, the system typically solves an optimization problem that takes as input the airline's flight network schedule, fares and forecasted passenger demands for all products available for booking on the airline's flight network, and available capacity on each of the airline's scheduled flights.

29 Claims, 14 Drawing Sheets

OTHER PUBLICATIONS

E. Cascetta and S. Nguyen, *A Unified Framework for Estimating or Updating Origin/Destination Matrices from From Traffic Counts*, Transportation Research B, 22 (1988), pp. 437–455.

E. Cascetta and M. Postorino, *Fixed Point Approaches to the Estimation of O/D Matrices Using Traffic Counts in Congested Networks*, Transportation Science, 35 (2001), pp.134–147.

Y. Chen and M. Florian, *O–D Demand Adjustment Problem with Congestion: Part I. Model Analysis and Optimality Conditions*, Publication CRT–94–56, Centre de Recherche sur les Transports, Université de Montréal, Montréal, 1994.

C. S. Fisk, *On Combining Maximum Entropy Trip Matrix Estimation with User Optimal Assignment*, Transportation Research B, 22 (1988), pp. 69–79.

C. S. Fisk and D.E. Boyce, *A Note on Trip Matrix Estimation from Link Traffic Count Data,*, Transportation Research B, 17 (1983), pp. 245–250.

M. Florian and Y. Chen, *A Coordinate Descent Method for the Bilevel O–D Matrix Adjustment Problem*, Publication #807, Centre de Recherche sur les Transports, Université de Montréal, Montréal, Feb. 1992–Revised May 1993, pp. 1–27.

A. C. Lim, *Transportation Network Design Problems: An MPEC Approach*, Department of Mathematical Sciences, Johns Hopkins University, Baltimore, May 1999, pp. 1–129.

B. Vinod, *Origin–and–Destination Yield Management*, The Handbook of Airline Economics, D. Jenkins, ed., Aviation Week Group, Washing, 1995, pp. 459–468.

H. Yang, *Heuristic Algorithms For the Bilevel Origin–Destination Matrix Estimation Problem*, Transportation Research B, 29 (1995), pp. 231–242.

H. Yang, Q. Meng, and M. G. Bell, *Simultaneous Estimaiton of the Origin–Destination Matrices and Travel–Cost Coefficient for Congested Networks in a Stochastic User Equilibrium*, Transportation Science, 35 (2001), pp. 107–123.

H. Yang, T. Sasaki, Y. Iida, and Y. Asakura, *Estimation of Origin–Destination Matrices From Link Traffic Counts on Congested Networks*, Transportation Research B, 26 (1992), pp. 417–434.

J.H. V. Zuylen and L.G. Willumsen, *The Most Likely Trip Matrix Estimated From Traffic Counts*, Transportation Research B., 14 (1980), pp. 281–293.

Sang Nguyen, *Estimating Origin–Destination Matrices From Observed Flows*, Centre de Recherche sur les Transports, Université de Montréal, Transportation Planning Models, ©Elsevier Science Publishers B.V. (North–Holland), 1984, pp. 363–380.

Alvin C. Lim and Jong–Shi Pang, *The O–D Demand Matrix Adjustment Problem: An MPEC Approach*, Department of Mathematical Science, The Johns Hopkins University, May 23, 1999, pp. 1–23.

* cited by examiner

METHOD AND SYSTEM FOR ORIGIN-DESTINATION PASSENGER DEMAND FORECAST INFERENCE

STATEMENT OF RELATED PATENT APPLICATION

This non-provisional patent application claims priority under 35 U.S.C. § 119 to U.S. Provisional Patent Application No. 60/341,442, titled Origin-Destination Passenger Demand Forecasting System, filed Dec. 14, 2001. This provisional application is hereby fully incorporated herein by reference.

FIELD OF THE INVENTION

The present invention relates to the field of revenue management. In particular, the present invention can access available flight segment-level unconstrained passenger demand forecasts for all scheduled flight segments in an airline's network and historical origin-destination level passenger demands for all origin-destination pairs served by the airline and compute unconstrained passenger demand forecasts for all available service products in the airline's network flight schedule. This allows the airline to have better data in maximizing revenues from the sale of its inventory of service products.

BACKGROUND OF THE INVENTION

Growth in the transportation business and, in particular, the airline industry has resulted in the increased use of central reservation host computers for providing schedule, flight, fare, and availability information on a real-time request basis. Historically, the host computer's response to consumer requests for service products was supported by accessing their value category and the corresponding flight segment availability stored on a central reservation database. While prior systems, such as the one just described, have provided airline revenue management on the flight-segment level, they proved to be very inefficient, as passengers typically request service products by origin and destination rather than by flight segment, and airlines typically price services by origin and destination as well.

An Origin-Destination Revenue Management System (ODRMS) provides improved revenue management capability for airlines by leveraging the value derived from origin-destination (OD) information of passengers. It allows revenue management control to be better aligned with the way passengers plan their travel and the way airlines price their service products.

To understand the distinction between flight segments, OD pairs and service products joining an OD pair, an example may be appropriate. A passenger requests travel service from Atlanta, Ga. (ATL) to Los Angeles, Calif. (LAX). Depending on the availability, an airline might offer various service products to satisfy the request: (1) a non-stop ATL-LAX flight, or (2) an itinerary with a stop in Dallas, Tex. (DFW) consisting of the flight segments ATL-DFW and DFW-LAX. While ATL-LAX is the OD pair in either service product options, the service product in option (1) consists of one flight segment, while the service product in option (2) consists of two flight segments.

Central to a typical ODRMS is a component that produces minimum acceptable fares for each service product an airline sells by optimizing the total revenue for an airline's network flight schedule. This component takes as its input the airline's network flight schedule, service product fares and unconstrained passenger demand forecast for all available service products. The term unconstrained demand forecast refers to a demand forecast inferred from both the demands that are observed (e.g., flown passengers) and demands are not observed (e.g., passengers not accommodated due to limited capacity). Apart from the service product unconstrained passenger demand forecasts, the airline has almost full control over the rest of the input components as these are predetermined by the airline. It turns out, however, that forecasting passenger demands for an airline's service products is not a trivial task.

Currently, most airlines have network revenue management systems in place, which forecast unconstrained passenger demand at the segment level. As discussed earlier, however, to determine the minimum acceptable fares for origin-destination service products in an ODRMS, service product level forecasts at the origin-destination level are required. The ability to infer service product level unconstrained demand forecasts from segment level unconstrained demand forecast is attractive as it allows for the enhancement of currently active systems for use in an ODRMS with minimal cost and maximum utilization of existing systems.

Prior ODRMS attempted to infer service product level unconstrained demand from segment level unconstrained demand using a technique known as parsing. In the parsing method, the system uses historical data to determine the percentages representing the proportion of the segment level demand that is attributable to a particular OD service product using a segment. From the percentages, service product level unconstrained demand forecast might be derived. In some cases, conflicting service product level unconstrained demand forecasts might be derived by parsing different segments used by the same service product. Methods used to reconcile the conflicting demand forecasts include selecting the minimum demand forecast, selecting the maximum demand forecast, taking a weighted mean of the variant forecasts, or taking the median of the variant forecasts. In practice, none of these reconciliation methods are satisfactory as the service product unconstrained demand forecasts become inconsistent with the segment level unconstrained demand forecasts and thus, less accurate. Prior systems also fail to take into account consumer preference for available service products joining an OD pair in determining service product level unconstrained demand forecasts.

In view of the foregoing, there is a need for an improved origin-destination service product unconstrained demand forecast inference system in the revenue management field.

SUMMARY OF THE INVENTION

An airline origin-destination (OD) revenue management software system supports decisions to accept or deny requests for booking airline seats by comparing the fare for the request with a minimum acceptable fare predetermined by the system. In order to determine the minimum acceptable fare, the system typically solves an optimization problem that accepts as inputs the airline's network flight schedule, service product fares, unconstrained passenger demand forecast for all service products available for booking on the airline's flight network, and available capacity on each of the airline's scheduled flight segments.

The inventive methods and system disclosed herein provide a means for accessing a centrally located information repository and retrieving inventory resource type and value information in an execution environment that allows a determination of an estimated origin-destination service product unconstrained demand for a given origin, destination and service product. Thus, one aspect of the present invention is to provide an execution environment that best estimates unconstrained demand for all service products between an origin and a destination based on segment level forecasts, historical demand, available service products, current flight schedule, and historical consumer preference.

The present invention supports a calculation of an estimated origin-destination service product unconstrained demand. Estimated origin-destination service product unconstrained demand represents consumer demand for an origin-destination service product. Furthermore, the demand is denoted as an unconstrained demand because it typically includes the number of consumers who will book a flight from the origin city to the destination city and those consumers who might be denied an opportunity to book a flight or chose not to book a flight.

The calculation begins by retrieving a segment level unconstrained demand forecast for each segment within an origin-destination pair. The segment level forecast can be retrieved from one or more forecasting systems connected to a computer network and represents consumer demand for a segment. The description of the difference between a flight segment, an OD pair and service products joining an OD pair can best be understood from a representative example for the air transportation field. A passenger requests travel service from Atlanta (ATL) to Los Angeles (LAX). Depending on the availability, an airline might offer various service products to satisfy the request: (1) a non-stop ATL-LAX flight, or (2) an itinerary with a stop in Dallas (DFW) consisting of the flight segments ATL-DFW and DFW-LAX. While ATL-LAX is the OD pair in either service product options, the service product in option (1) consists of one flight segment, while the service product in option (2) consists of two flight segments.

A consumer preference for service products joining an origin-destination pair can be generated by a consumer product preference analyzer, connected to the computer network. The analyzer can be implemented by a product preference analysis computer. The preference typically represents the probability that a consumer traveling on a particular origin-destination pair will use a particular service product, in the form of a matrix. The preference can be generated using historical passenger data stored on a set of information databases connected to the computer network. The information databases typically represent a passenger name record database comprising departure dates, flight origin, flight destination, departure time, class of service, flight segments, amount a consumer paid for the service product, and historical origin-destination pair demand. A network flight schedule can then be determined within the analyzer. The network flight schedule typically represents a determination whether a service product uses a particular flight segment. The schedule can be generated by analyzing and comparing information gleaned from consumer preference for service origin-destination service products and the scheduled flight information derived from the description of the segment level unconstrained demand forecast.

A historical origin-destination pair demand can then be retrieved from a set of information databases connected to the computer network. These databases typically represent the reservation database and the passenger name record database. Historical origin-destination pair demands can be denoted as a vector representing demand levels for all origin-destination pairs serviced by the airline. A scaled historical origin-destination passenger demand can be determined based on the historical origin-destination demand and a determination of whether the destination is an important destination for the origin. Determination of importance is typically affected by a comparison of the historical demand from an origin to a destination as compared to the total historical demand of all products originating from the origin city. A scaled historical origin-destination passenger demand can be used in place of historical origin-destination passenger demand in the continuing method.

An origin-destination unconstrained demand can be determined and is typically represented by an estimated origin-destination pair unconstrained demand. Estimated origin-destination pair unconstrained demand can be generated by a demand forecasting determiner connected to a computer network. The demand forecasting determiner is typically implemented by an origin-destination forecast inference computer. Estimated origin-destination unconstrained demand represents the future demand level for an origin-destination pair, without reference to the service product chosen by the consumer. Estimated origin-destination unconstrained demand is typically determined by solving a least squares optimization problem represented as a quadratic program. The quadratic program can accept as its inputs: segment level unconstrained demand forecast, consumer preference for origin-destination service products, historical origin-destination pair demand, and the network flight schedule. The quadratic program can also accept the additional input of a historical demand adjustment factor. The historical demand adjustment factor is typically input by the inventory manager from a user input terminal and can be used to adjust the relative importance of the historical origin-destination observed demands against future segment unconstrained demand estimations.

An estimated origin-destination service product unconstrained demand can be generated by the origin-destination forecast inference computer. The inference computer can use the estimated origin-destination unconstrained demand and the consumer preference for products within an origin-destination pair to generate estimated origin-destination service product unconstrained demand.

BRIEF DESCRIPTION OF DRAWINGS

For a more complete understanding of the present invention and the advantages thereof, reference is now made to the following description in conjunction with the accompanying drawings in which.

DETAILED DESCRIPTION OF THE EXEMPLARY EMBODIMENTS

Figure 1:
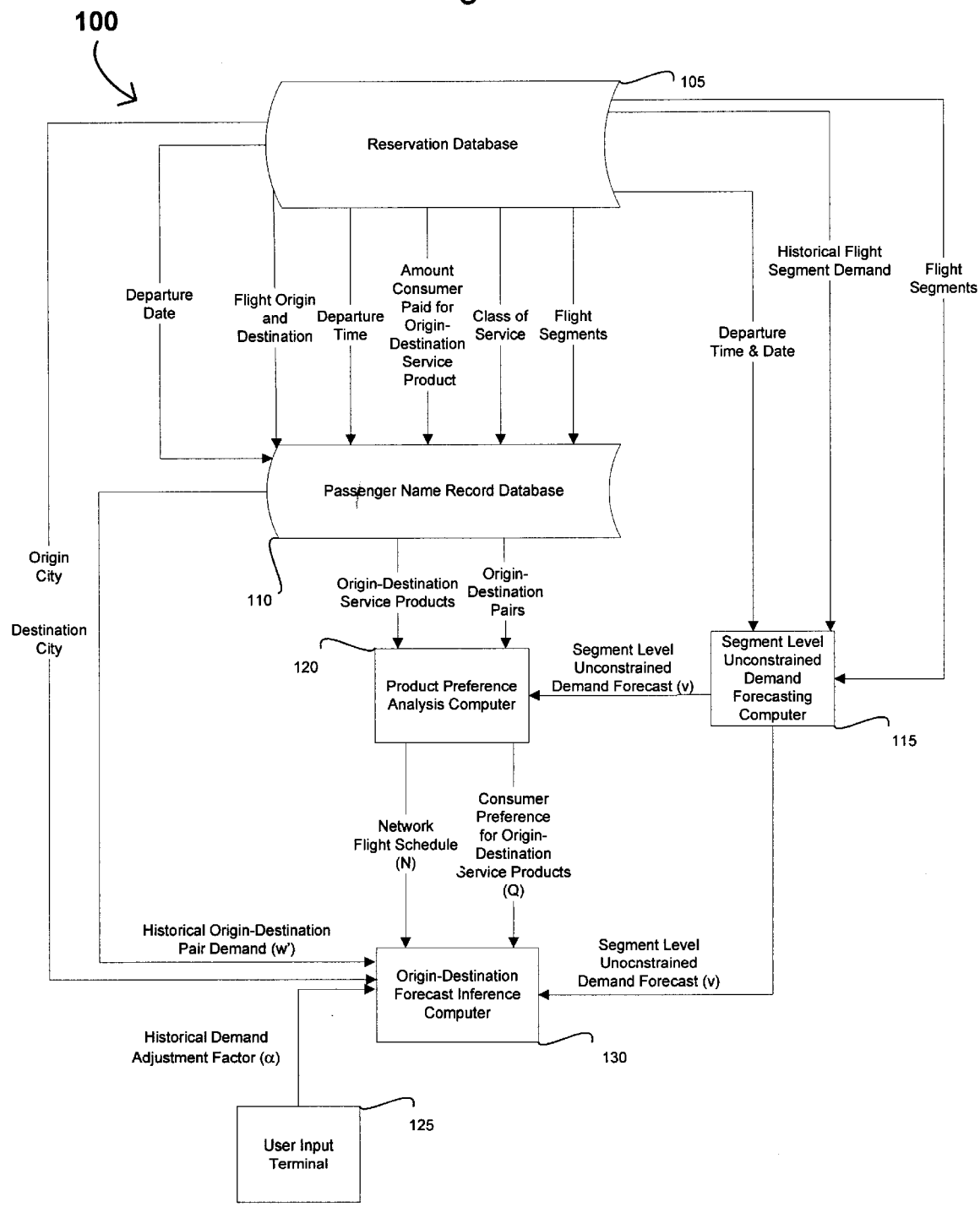
FIG. 1 is a block diagram of a revenue management computer system constructed in accordance with an exemplary embodiment of the present invention.

The present invention supports a determination of a new demand forecast for all available origin-destination service products in an airline's scheduled flight network as can be more readily understood by reference to system 100 of FIG. 1. FIG. 1 is a block diagram illustrating a revenue management computer system 100 constructed in accordance with an exemplary embodiment of the present invention. The exemplary revenue management system 100 comprises a reservation database 105, a passenger name record database 110, a segment level unconstrained demand forecasting computer 115, a product preference analysis computer 120, a user input terminal 125, and an origin-destination forecast inference computer 130.

The reservation database 105 is communicably attached via a computer network to the passenger name record database 110, segment level forecasting computer 115 and the origin-destination forecast inference computer 130. The reservation database 105 typically contains available product information including, but not limited to, departure date, flight origin, flight destination, departure time, amount consumer paid for the origin-destination service product, class of service, historical flight segment demand, and other relevant flight segment information. The reservation database 105 can transmit information to the passenger name record database 110 including, but not limited to, departure date, flight origin and destination, departure time, class of service, amount consumer paid for an origin-destination service product, and other relevant flight segment information. The reservation database 105 also can transmit information to the segment level unconstrained demand forecasting computer 115 including, but not limited to historical flight segment demand, departure time and date of flight segments, and other relevant flight segment information. The reservation database 105 can also transmit information to the origin-destination forecast inference computer 130 including, but not limited to, origin cities and destination cities. The reservation database 105 can be implemented by one or more of several central reservation systems, such as those operated or supported by AMERICAN AIRLINES, INC., SABRE, EDS, SYSTEM ONE, COVIA, WORLDSPAN, or any other similar central reservation system.

The passenger name record database 110 is communicably attached to the reservation database 105, the product preference analysis computer 120, and the origin-destination forecast inference computer 130 via a computer network. The passenger name record database 110 contains historical transaction records that are updated on a periodic maintenance cycle. The historical transaction records typically contain information including, but not limited to, name of consumer, flight segments purchased, departure times and dates, class of service, amounts paid for previous origin-destination service products, origin-destination service products, origin-destination pairs and historical origin-destination pair demand. The passenger name record database 110 can further provide a mechanism for determining origin-destination service products and origin-destination pairs based on information communicably received from the reservation database 105. The passenger name record database 110 can transmit information to the product preference analysis computer 120 including, but not limited to origin-destination service products and origin-destination pairs. The passenger name record database 110 also can transmit information to the origin-destination forecast inference computer 130 including, historical origin-destination pair demand.

The segment level unconstrained demand forecasting computer 115 is communicably attached to the reservation database 105, the product preference analysis computer 120, and the origin-destination forecast inference computer 130 via a computer network. The segment level forecasting computer 115 can provide a mechanism for updating unconstrained passenger demand forecasts at the flight segment level. Typically, information communicably transmitted from the segment level forecasting computer 115 to the product preference analysis computer 120 and the origin-destination forecast inference computer 130 comprises a segment level unconstrained demand forecast. In one exemplary embodiment, the passenger demand forecasts at the flight segment level are forecasts of a future departure day's demand. The use of segment level unconstrained passenger demand forecasts to infer an estimated origin-destination service product unconstrained demand allows for the use of current technology to support forecasting at the required new level.

The product preference analysis computer 120 can be communicably attached to the passenger name record database 110, segment level unconstrained demand forecasting computer 115, and the origin-destination forecast inference computer 130 via a computer network. The product preference analysis computer 120 typically provides a mechanism for determining consumer preference for origin-destination service products, Q, using origin-destination pairs and origin-destination service products, which can be retrieved from the passenger name record database 110. The product preference analysis computer 120 can also provide a mechanism for determining a network flight schedule, N, based on consumer preference for origin-destination service products, Q, and information from segment level unconstrained demand forecast, v, which can be retrieved from the segment level unconstrained demand forecasting computer 115. Typically, information communicably transmitted from the product preference analysis computer 120 to the origin-destination forecast inference computer 130 comprises the network flight schedule and the consumer preference for origin-destination service products.

The user input terminal 125 can be communicably attached to the origin-destination forecast inference computer 130. The user input terminal 125 typically provides an inventory manager with an opportunity to input information relating to a historical demand adjustment factor, into the origin-destination forecast inference computer 130 to support a determination of estimated origin-destination unconstrained demand. The user input terminal 125 can also provide the inventory manager with an opportunity to input information relating to an important city percentile cut-off value, into the origin-destination forecast inference computer 130, for the determination of a scaled historical origin-destination pair demand. In one exemplary embodiment, the user input terminal 125 is a personal computer coupled to the origin-destination forecast inference computer 130 via a computer network.

The origin-destination forecast inference computer 130 can be communicably attached to the passenger name record database 110, the segment level unconstrained demand forecasting computer 115, the product preference analysis computer 120, and the user input terminal, 125. In one exemplary embodiment, the origin-destination forecast inference computer 130 provides a mechanism for determining an estimated origin-destination unconstrained demand, w based on historical origin-destination pair demand, w', segment level unconstrained demand forecast, v, the network flight schedule, N, the consumer preference for origin-destination service products, Q, and the historical demand adjustment factor, α.

In another exemplary embodiment, the origin-destination forecast inference computer 130 provides a mechanism for determining a scaled historical origin-destination pair demand, ŵ, based on historical origin-destination pair demand, w', retrieved from the passenger name record database 110. Subsequently, the origin-destination forecast inference computer 130 provides a mechanism for determining an estimated origin-destination unconstrained demand, w based on scaled historical origin-destination pair demand, ŵ, segment level unconstrained demand forecast, v, the network flight schedule, N, the consumer preference for origin-destination service products, Q, and the historical demand adjustment factor, α.

The origin-destination forecast inference system computer 130 can further provide a mechanism for determining an estimated origin-destination service product unconstrained demand, d, based on consumer preference for origin-destination service products, Q, retrieved from the product preference analysis computer 120, and the estimated origin-destination unconstrained demand, w.

Figure 2:
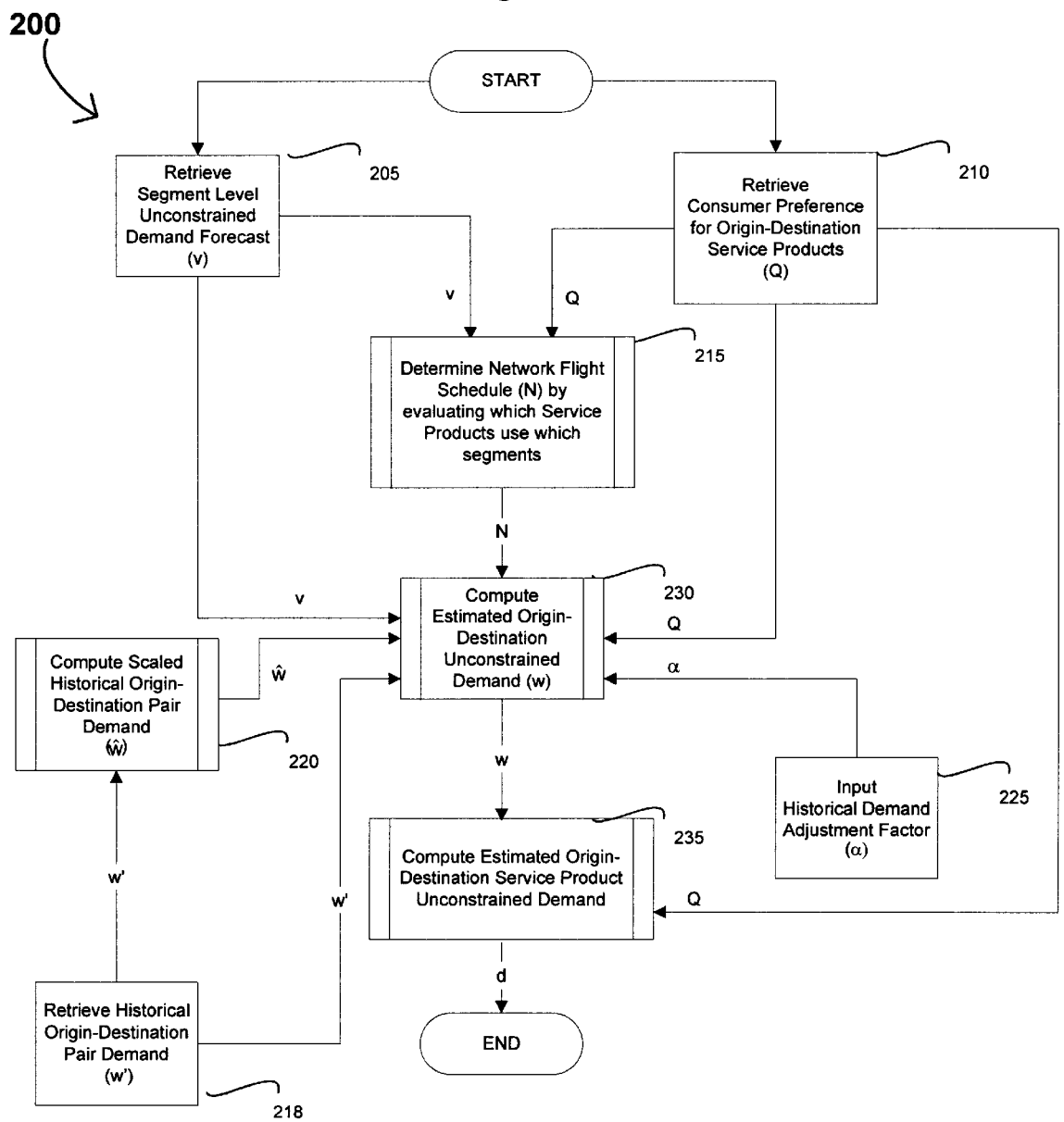
FIG. 2 is a flow chart illustrating the steps of a process for revenue management in accordance with an exemplary embodiment of the present invention.

FIGS. 2–14 are logical flowchart diagrams illustrating the computer-implemented processes completed by an exemplary embodiment of a revenue management system. Turning now to FIG. 2, a logical flow chart diagram 200 is presented to illustrate the general steps of an exemplary process for revenue management in accordance with the revenue management computer system 100 of FIG. 1.

Now referring to FIGS. 1 and 2, a method 200 for determining an estimated origin-destination service product unconstrained demand d, begins at the START step and proceeds to step 205, in which a segment level unconstrained demand forecast v is retrieved from the segment level unconstrained demand forecasting computer 115 by the product preference analysis computer 120. The creation of the segment level unconstrained demand forecast v typically involves a conventional forecasting algorithm implemented in a software program executed on segment level unconstrained demand forecasting computer 115. The segment level unconstrained demand forecast typically represents an estimated passenger demand for service at the flight segment level. The estimated demand is an unconstrained demand, in that, the estimates are of those consumers who will actually use service on the flight segment as well as those who will request service on the flight segment but will not be granted a booking due to various reasons.

In step 210, the product preference analysis computer 120 determines the consumer preference for origin-destination service products Q from information retrieved from the passenger name record database 110. The product preference analysis computer 120 typically retrieves the origin-destination pairs and the origin-destination service products from the passenger name record database 110. The product preference analysis computer 120 can then determine the probability that a consumer traveling on an origin-destination pair will use an origin-destination service product. The consumer preference for service products Q is typically implemented by a passenger choice matrix, mapping origin-destination pairs to origin-destination service products.

In step 215, the product preference analysis computer 120 generates the network flight schedule N. The network flight schedule N can be generated by accepting the segment level unconstrained demand forecast v from the segment level unconstrained demand forecasting computer 115, and retrieving consumer preference for origin-destination service products Q from the product preference analysis computer 120. The product preference analysis computer 120 can generate the network flight schedule N, in step 215, by first identifying flight segments listed in the segment level unconstrained demand forecast, v. Next, the product preference analysis computer 120 identifies service products listed in Q. Then, the product preference analysis computer 120 determines whether or not the flight segment is contained within the service product. If a flight segment is contained within a service product, a 1 is typically placed in the network flight schedule N, corresponding to the flight segment and service product analyzed. If a flight segment is not contained within a service product, a 0 is typically placed in the network flight schedule N, corresponding to the flight segment and service product analyzed. The network flight schedule N is typically a matrix whose rows are indexed by flight segments and whose columns are indexed by origin-destination service products.

In step 218, historical origin-destination pair demand w' is retrieved from the passenger name record database 110 by the origin-destination forecast inference computer 130. Historical origin-destination pair demand w' is typically generated by the reservation database 105 and stored in the passenger name record database 110. Historical origin-destination pair demand w' can summarize how consumers traveled in the past at the origin-destination level, without regard to the flight segments flown by the consumer. Furthermore, the historical origin-destination pair demand, w', is typically derived only from observed origin to destination demand of passengers and not on a consumer's preference for particular service products. In one exemplary embodiment, the origin-destination forecast inference computer 130 takes the historical origin-destination pair demand w' retrieved in step 220 and directly inputs that value into the calculation of estimated origin-destination unconstrained demand w in step 230.

In another exemplary embodiment, the process flow subsequently continues from step 218 to step 220 for the computation of scaled historical origin-destination pair demand ŵ within the origin-destination forecast inference computer (inference computer) 130. The scaled historical origin-destination pair demand, ŵ, is determined based on the historical origin-destination pair demand w' in a process later described in FIGS. 4–12.

A historical demand adjustment factor α can also be retrieved by the inference computer 130 and input into the computation of estimated origin-destination unconstrained demand w in step 230. The historical demand adjustment factor α can be input, in step 225, by an inventory manager, from the user input terminal 125. In deciding what value to input for the historical demand adjustment factor α, the inventory manager must determine whether to give more weight to the historical origin-destination pair demand w', accepted from step 218, or the segment level unconstrained demand forecast v, accepted from step 205. If the inventory manager determines to place more weight on historical origin-destination pair demand w', then the historical demand adjustment factor α will be given a value greater than one. On the other hand, if the inventory manager determines to place more weight on segment level unconstrained demand forecast v, then the historical demand adjustment factor α will be given a value of less than one and greater than zero. In one exemplary embodiment, the inventory manager inputs a value of 0.1 for historical demand adjustment factor α.

In step 230, the origin-destination forecast inference computer 130 determines the estimated origin-destination unconstrained demand, w Typically, the estimated origin-destination unconstrained demand w is a forecast of consumer demand at the origin-destination level, regardless of what flight segments a consumer chooses. The determination of estimated origin-destination unconstrained demand w typically begins with the origin-destination forecast inference computer 130 accepting the segment level unconstrained demand forecast v, consumer preference for OD service products Q, the network flight schedule N, the historical origin-destination pair demand w', and the historical demand adjustment factor α, as collected in steps 205, 210, 215, 218, and 225, respectively. In one exemplary embodiment the inference computer 130 takes the retrieved inputs from steps 205, 210, 215, 218, and 225 and plugs them into a least squares optimization model, with the output being an estimated origin-destination unconstrained demand w. Typically, the optimization model receiving the inputs is formulated and solved as a quadratic program. The quadratic program can be solved using standard optimization algorithms such as the primal-dual predictor-corrector interior point method. Those skilled in the art will appreciate that a wide variety of methods exist for solving a quadratic optimization problem as in step 230. Also, those skilled in the art will appreciate the wide variety of optimization models for estimating the origin-destination unconstrained demand w including, but not limited to, minimizing absolute error, minimizing relative error, and minimizing entropy.

In one exemplary embodiment, the computation of estimated origin-destination unconstrained demand in step 230 begins by completing steps 205, 210, 215, and 218. In step 230, the accepted inputs v, Q, N, and w' are plugged into the following mathematical model:

$$\min \|NQ^T w - v\|^2 + \|w - w'\|^2$$

subject to $w \geq 0$,

The mathematical model solves for w the estimated origin-destination unconstrained demand, with T representing the transpose of the matrix representing consumer preference for origin-destination service products Q.

In another exemplary embodiment, the computation of estimated origin-destination unconstrained demand in step 230 begins by completing steps 205, 210, 215, 218, and 225. The accepted inputs v, Q, N, w', and α are then plugged into the following mathematical model:

$$\min \|NQ^T w - v\|^2 + \alpha \|w - w'\|^2$$

subject to $w \geq 0$,

The mathematical model solves for w the estimated origin-destination unconstrained demand, with T representing the transpose of the matrix representing consumer preference for origin-destination service products, Q. In this exemplary embodiment of step 230, the historical demand adjustment factor, α, is typically set equal to 0.1 by the inventory manager from the user input terminal 125.

In step 235, the origin-destination forecast inference computer 130 computes an estimated origin-destination service product unconstrained demand, d. Typically, the inference computer 130 accepts the consumer preference for OD service products Q from step 210 and the estimated origin-destination unconstrained demand w calculated in step 230. Then, the inference computer 130 can use inputs Q and w to determine the estimated origin-destination service product unconstrained demand d. In one exemplary embodiment, the inference computer 130 computes estimated origin-destination service product unconstrained demand d, in step 235, using the formula: $d = Q^T w$; where w typically represents the estimated origin-destination unconstrained demand w computed in step 230, Q typically represents a matrix of consumer preference for origin-destination service products, and T represents the transpose of the matrix Q.

In step 220, the origin-destination forecast inference computer 130 can compute a scaled historical origin-destination pair demand, $\hat{w}$. The computations completed in step of 220 typically begin by accepting the historical origin-destination pair demand w' retrieved in step 218. Then, the inference computer 130 determines if the destination city is an important destination city for the origin city. The important destination city determination typically begins by determining the total number of booked consumers who departed a given origin city and ended in a given destination city (OD number). A destination city percentage is calculated by dividing the OD number by the total number of booked consumers departing a given origin city. The destination cities are ranked in descending order based on the destination city percentage. A cumulative percentage of destination city percentages is calculated, beginning with the highest ranked destination city. The destination cities above a predetermined important city percentile are determined to be unimportant destination cities to the origin city. In one exemplary embodiment, the important city percentile for determining if a destination city is important to an origin city is eighty percent (80%). If a destination city is important to the origin city, then the inference computer 130 typically computes $\hat{w}$ as the product of the fraction of all traffic leaving an origin city that terminates in a destination city and an estimate of all traffic leaving an origin city. Furthermore, it is typical for all important destination cities to have a different value for $\hat{w}$. If a destination city is unimportant to the origin city, then the inference computer 130 typically computes $\hat{w}$ as the difference of all estimated traffic leaving an origin city and the sum of all important destination cities' $\hat{w}$ divided by the total number of unimportant destination cities. Thus, unimportant cities for an origin city typically have the same computed value for $\hat{w}$. In one exemplary embodiment, computing scaled historical origin-destination pair demand, in step 220, can provide another overall solution for estimated origin-destination unconstrained demand w thereby creating another solution for estimated origin-destination service product unconstrained demand, d. Thus, once scaled historical origin-destination pair demand, $\hat{w}$, is calculated, it can be substituted in place of historical origin-destination pair demand w' in the calculation of estimated origin-destination unconstrained demand, in step 230.

Figure 3:
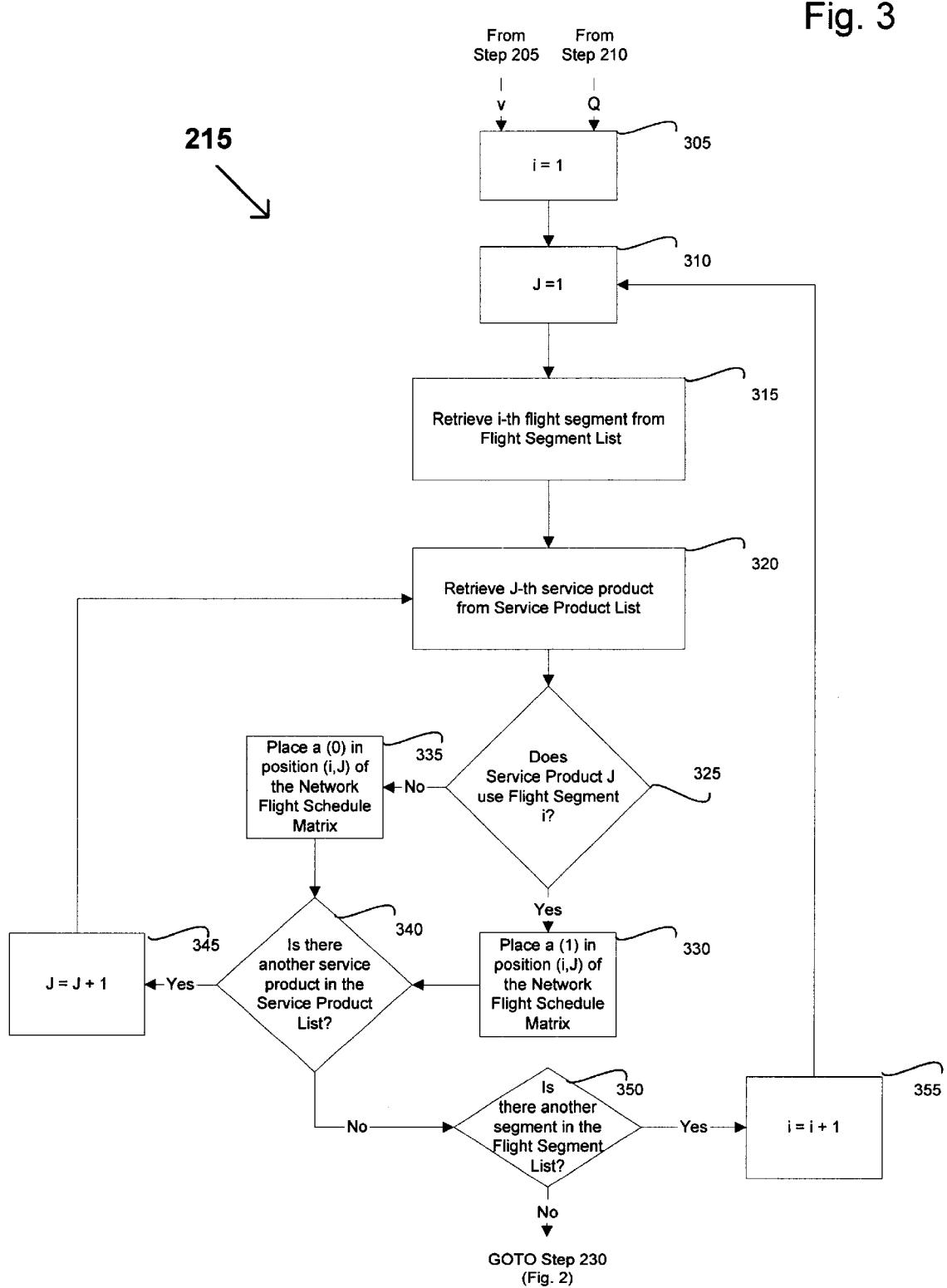
FIG. 3 is a flow chart illustrating a process for collecting Network Flight Schedule, N, in accordance with an exemplary embodiment of the present invention.
Figure 4:
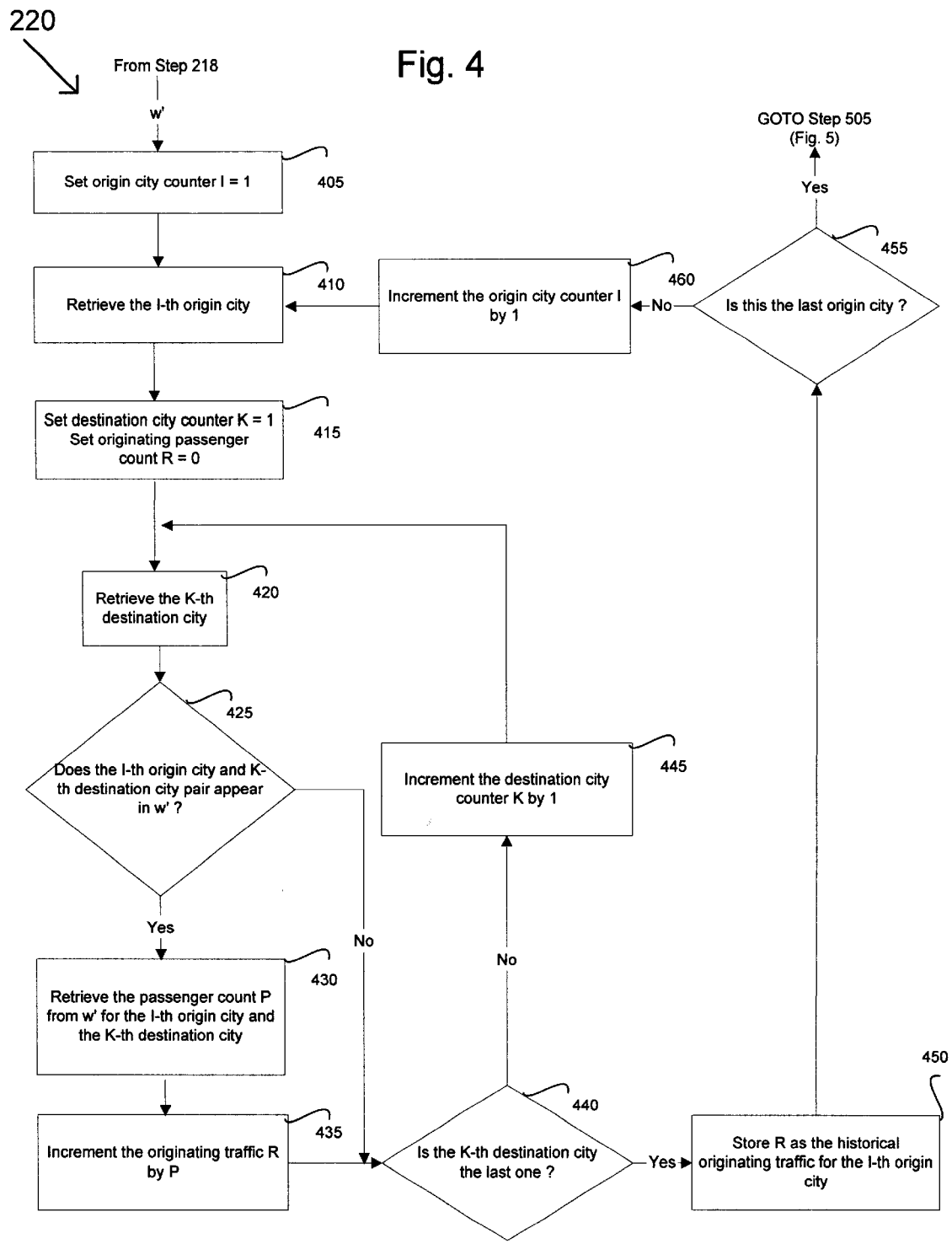
FIGS. 4–12 are a set of flow charts illustrating a process for computing a Scaled Historical Origin-destination Pair Demand, $\hat{w}$, in accordance with an exemplary embodiment of the present invention.

FIG. 3 is a logical flowchart diagram illustrating an exemplary computer-implemented process for completing the determination of the network flight schedule task of step 215 (FIG. 2). Referencing FIGS. 1, 2, and 3, the process 215 is initiated by accepting the segment level unconstrained demand forecast v, from step 205, and the consumer preference for origin-destination service products Q, from step 215. In step 305, a counter variable, i, is set equal to one. The counter variable i typically represents a flight segment from a set of flight segments that may be used by a consumer when traveling from a particular origin to a particular destination. For example, if a consumer traveled from Atlanta to Los Angeles with a layover in Dallas, there would be two flight segments, Atlanta to Dallas and Dallas to Los Angeles.

In step 310, a counter variable J is set equal to one. The variable J typically represents an origin-destination service product from the list of origin-destination service products available for each flight segment. In one exemplary embodiment, the list of available service products for an origin-destination pair includes: class of service, departure time, arrival time, departure day of the week, departure date, flight segment, meal service, and price charged to consumer for the service product. Other available service product variables are well known to those skilled in the art.

In step 315, the product preference analysis computer 120 retrieves flight segment i from the flight segment list. The flight segment list is typically located within the segment level unconstrained demand forecast v accepted from step 205. Then, the product preference analysis computer 120 retrieves service product J from the service product list in step 320. Typically, the service product list is located in the consumer preference for origin-destination service products Q accepted from step 210.

In step 325, an inquiry is conducted to determine if service product J uses flight segment i. If so, the "YES" branch is followed to step 330. Otherwise, the "NO" branch is followed to step 335. Based on the determination that origin-destination service product J uses flight segment i, the product preference analysis computer 120 places a 1 in position (i, J) of the matrix representing the network flight schedule N, in step 330. The network flight schedule matrix is made-up of columns of origin-destination service products and rows of flight segments. The placement of a 1 in the network flight schedule matrix typically represents that the flight segment of row i is a part of the origin-destination service product J. For example, a consumer buys a first-class ticket from Dallas to Los Angeles. The origin-destination service product is a first class seat from Dallas to Los Angeles. If the flight segment of row i is Dallas to Los Angeles, then the origin-destination service product uses the flight segment and the product preference analysis computer 120 places a 1 in the corresponding position of the network flight schedule matrix. The process then proceeds to step 340.

Based on a determination that origin-destination service product J does not use flight segment i, the product preference analysis computer 120 places a 0 in position (i, J) of the matrix representing network flight schedule N, in step 335.

Both steps 330 and 335 proceed to step 340 where an inquiry is conducted by the product preference analysis computer 120 to determine if there is another service product in the service product list. If so, the "YES" branch is followed to step 345. In step 345, the product preference analysis computer 120 increases the counter variable J by one and returns to step 320 for the retrieval of the next service product from the service product list. However, if no other service product remains in the service product list, the "NO" branch is followed to step 350.

In step 350, an inquiry is made by the product preference analysis computer 120 to determine if another flight segment is in the flight segment list. If so, the "YES" branch is followed to step 355. In step 355 the product preference analysis computer 120 increases the counter variable i by one and returns to step 310, where the counter variable J is reset to one. However, if no other flight segments remain in the flight segment list, the "NO" branch is followed to step 230 for the computation of estimated origin-destination unconstrained demand w in the inference computer 130.

FIGS. 4–12 are logical flowchart diagrams illustrating an exemplary computer-implemented process for completing the computation of the scaled historical origin-destination demand task of step 220 (FIG. 2). The computation of step 220 can occur with support by the inference computer 130. Referencing FIGS. 1, 2, and 4, the process 220 is initiated by accepting the historical origin-destination demand w' from step 218. In step 405, the inference computer sets the counter variable, origin city counter I to one. The origin city counter variable typically represents those cities from which a flight originates or begins its journey. In step 410, inference computer 130 retrieves origin city I from the reservation database 105. Then, the inference computer 130 sets the counter variables, destination city counter K equal to one and originating passenger count R equal to zero, in step 415. The variable K represents a selected destination city from a set of all destination cities that receive flights, either non-stop or with stop-overs, from the retrieved origin city. The variable R represents the number of passengers whose trip originates in the selected origin city. In step 420, the inference computer 130 retrieves a selected destination city K from a set of all destination cities for origin city I from the reservation database 105.

In step 425 an inquiry is conducted at the inference computer 130 to determine if an origin city I-destination city K pair appears in the historical origin-destination pair demand w' which was accepted from the passenger name record database 110, in step 218. Typically, the inference computer 130 searches historical origin-destination pair demand to determine if there is a history of consumer demand for the origin city I-destination city K pair. If the inference computer 130 determines that origin city I-destination city K does appear in the historical origin-destination pair demand w' then the "YES" branch is followed to step 430. In step 430 the inference computer 130 retrieves the passenger count P from historical origin-destination pair demand w' corresponding to the historical consumer demand for origin city I-destination city K pair. Then, in step 435, the inference computer 130 increases the originating passenger count R by the passenger count P, retrieved in step 430. Next, the process continues to step 440.

If the origin-destination forecast inference computer 130 determines that the origin city I-destination city K pair does not appear in the historical origin-destination pair demand, then the "NO" branch is followed to step 440.

In step 440, an inquiry is made by the origin-destination forecast inference computer 130 to determine if destination city K is the last destination city for origin city I in the reservation database 105. If not, then the "NO" branch is followed to step 445. In step 445, the inference computer 130 increases the counter variable, destination city counter K by 1. Subsequently, the process returns to step 420 for the retrieval by the inference computer 130 of the next destination city K for origin city I from the reservation database 105.

If destination city K is the last destination city for origin city I, then the "YES" branch is followed to step 450. In step 450, the originating passenger count R is stored in the inference computer 130 as the historical originating traffic for origin city I. In step 455, an inquiry is made by the inference computer 130 to determine if origin city I is the last origin city in the reservation database 105. If not, the "NO" branch is followed to step 460 and the inference computer 130 increases the counter variable, origin city counter I, by one. The process then returns to step 410 for the retrieval of the next origin city from the reservation database 105.

Figure 5:
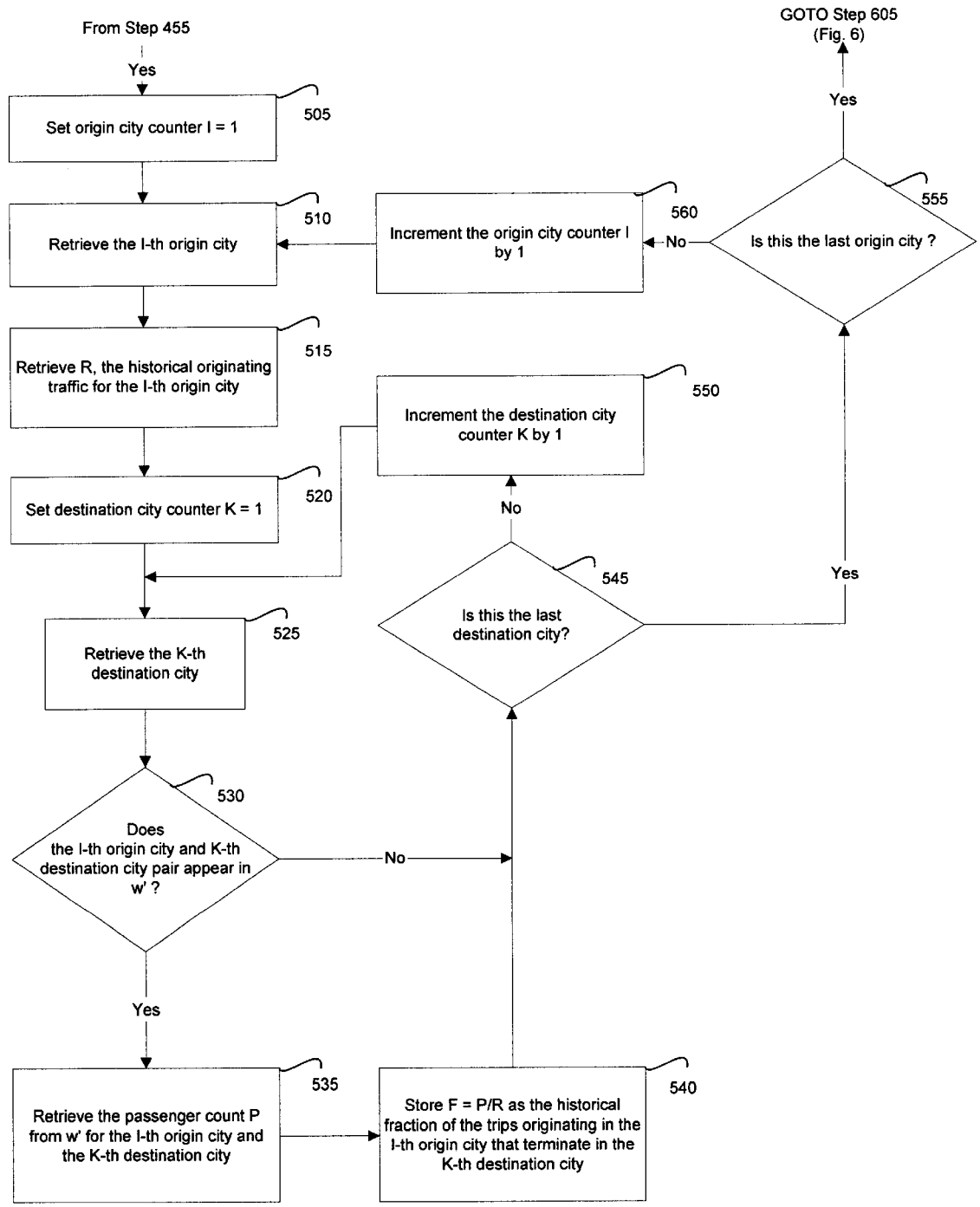

However, if the inference computer 130 determines that origin city I is the last origin city in the reservation database 105, then the "YES" branch is followed to step 505 (FIG. 5). Referring now to FIGS. 1, 2, and 5, in step 505, the inference computer 130 sets the counter variable, origin city counter I, to one. The origin city counter variable represents those cities from which a flight originates or begins its journey. In step 510, the inference computer 130 retrieves origin city I from the reservation database 105. Next, in step 515, the inference computer 130 retrieves the historical originating traffic R, which was stored in the inference computer 130 in step 450. Then, the inference computer 130 sets the counter variable, destination city counter K equal to one, in step 520. The variable K represents a selected destination city from a set of all destination cities that receive flights, either non-stop or with stop-overs, from the retrieved origin city. In step 525, the inference computer 130 retrieves destination city K from a set of all destination cities for origin city I, from the reservation database 105.

In step 530 an inquiry is conducted at the inference computer 130 to determine if an origin city I-destination city K pair appears in the historical origin-destination pair demand w' which was retrieved from the passenger name record database 110, in step 218. Typically, the inference computer 130 searches historical origin-destination pair demand to determine if there is a history of consumer demand for the origin city I-destination city K pair. If the inference computer 130 determines that origin city I-destination city K does appear in the historical origin-destination pair demand w', then the "YES" branch is followed to step 535. In step 535, the inference computer 130 retrieves the passenger count P from historical origin-destination pair demand w', corresponding to the historical consumer demand for the origin city I-destination city K pair. Next, the origin-destination forecast inference computer 130 determines a historical fraction F. Historical fraction F typically represents the fraction of all trips beginning in origin city I that terminate, or end, in destination city K. Historical fraction F can be determined by dividing passenger count P by historical originating traffic R, retrieved in steps 535 and 515. Then, the inference computer 130 can store the value corresponding to historical fraction F for later use. Next, the process continues to step 545.

If the origin-destination forecast inference computer 130 determines that the origin city I-destination city K pair does not appear in the historical origin-destination pair demand w', then the "NO" branch is followed to step 545. In step 545, an inquiry is made by the inference computer 130 to determine if destination city K is the last destination city for origin city I in the reservation database 105. If not, then the "NO" branch is followed to step 550. In step 550, the inference computer 130 increases the counter variable, destination city counter, K, by 1. Subsequently, the process returns to step 525 for the retrieval, by the inference computer 130, of the next destination city K for origin city I from the reservation database 105.

If destination city K is the last destination city for origin city I, then the "YES" branch is followed to step 555. In step 555, an inquiry is made by the inference computer 130 to determine if origin city I is the last origin city in the reservation database 105. If not, the "NO" branch is followed to step 560. Then, the inference computer 130 increases the counter variable, origin city counter I, by one. Next, the process returns to step 510 for the retrieval of the next origin city from the reservation database 105.

Figure 6:
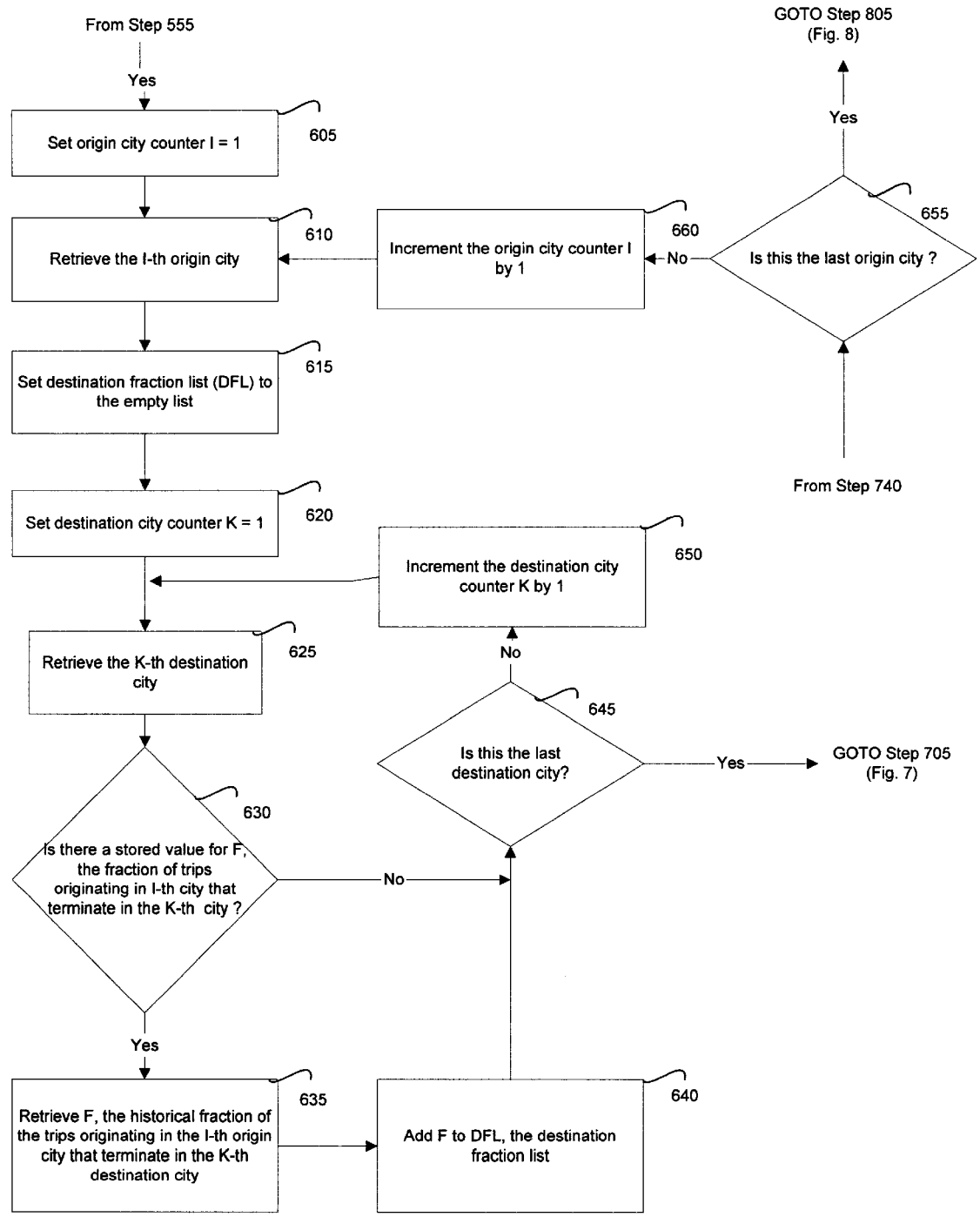

However, if the inference computer 130 determines that origin city I is the last origin city in the reservation database 105, then the "YES" branch is followed to step 605 (FIG. 6). Turning now to FIGS. 1, 2, and 6, in step 605, the inference computer 130 sets the counter variable, origin city counter I, to one. The origin city counter variable represents those cities from which a flight originates or begins its journey. In step 610, the inference computer 130 retrieves origin city I from the reservation database 105. Next, in step 615, the inference computer 130 creates an empty list, denominated destination fraction list (DFL). The DFL is used to store the historical fractions of all destination cities K for a given origin city I. The historical fraction for a distinct origin city I-destination city K pair typically represents the amount of historical demand for the origin city I-destination city K pair divided by the total historical demand for all flights originating in the origin city. Then, the inference computer 130 sets the counter variable, destination city counter K, equal to one in step 620. The variable K represents a selected destination city from a set of all destination cities that receive flights, either non-stop or with stop-overs, from the retrieved origin city. In step 625, the inference computer 130 retrieves destination city K from a set of all destination cities for origin city I, from the reservation database 105.

In step 630 an inquiry is conducted at the inference computer 130 to determine if a historical fraction F is stored in the local memory of inference computer 130 in step 540 for the particular origin city I-destination city K pair. If so, the "YES" branch is followed to step 635 because the inference computer 130 can retrieve a historical fraction F to place into the DFL. In step 630, the inference computer 130 retrieves the value F. Then, in step 640, the inference computer 130 stores the value F for origin city I-destination city K pair into the destination fraction list, DFL. Next, the flow proceeds to step 645.

If the inference computer 130 does not find a stored value F for origin city I-destination city K pair, the "NO" branch is followed to step 645. In step 645, an inquiry is made by the inference computer 130 to determine if destination city K is the last destination city for origin city I in the reservation database 105. If not, then the "NO" branch is followed to step 650. In step 650, the inference computer 130 increases the counter variable, destination city counter K, by 1. Subsequently, the process returns to step 625 for retrieval by the inference computer 130 of the next destination city K for origin city I from the reservation database 105.

Figure 7:
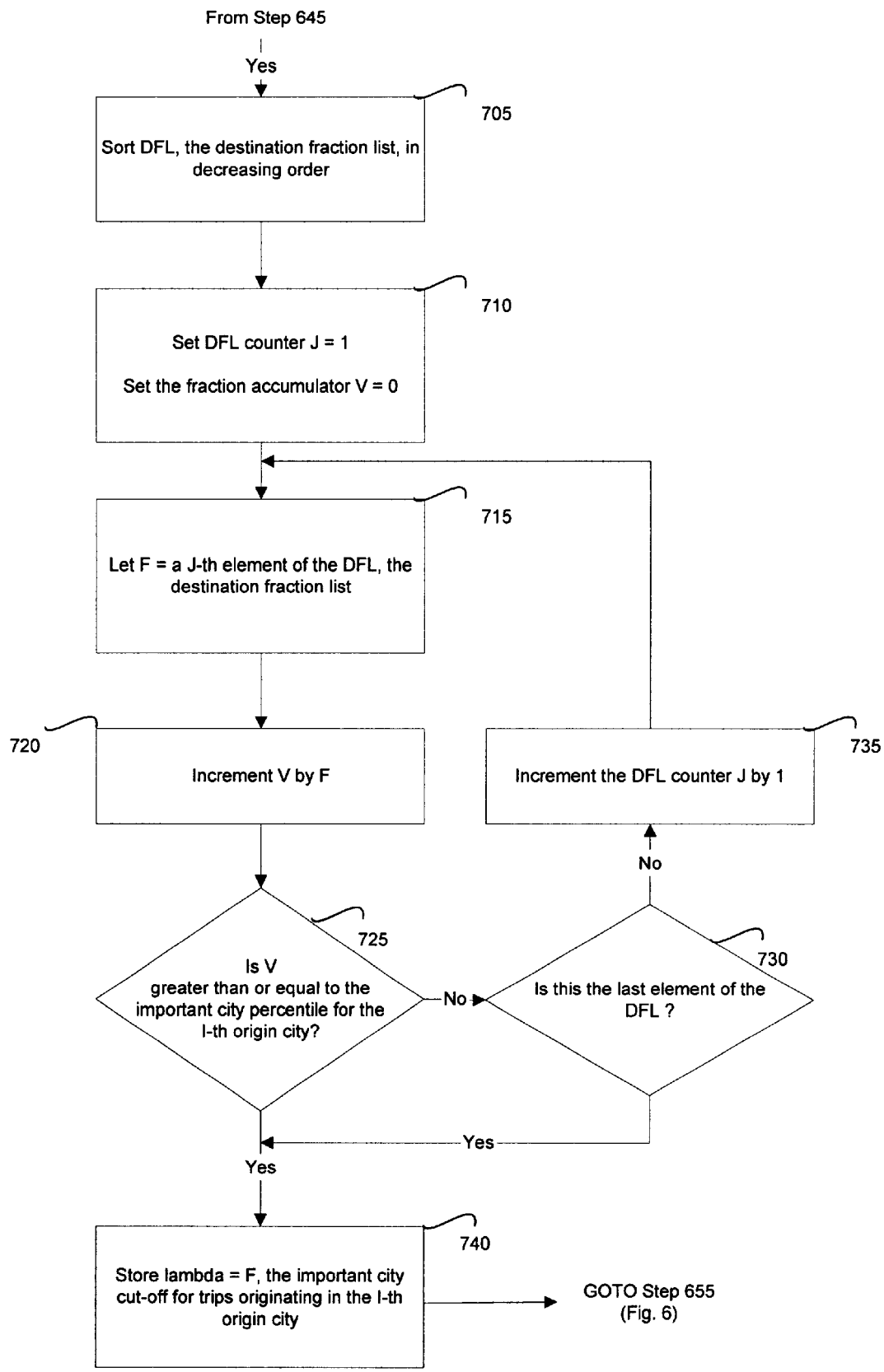

If destination city K is the last destination city for origin city I, then the "YES" branch is followed to step 705 (FIG. 7). As shown in FIGS. 1, 2, and 7, in step 705, the inference computer 130 takes the destination fraction list, created and filled in step 615–640, and sorts the historical fractions, F, within the DFL from highest to lowest for each distinct origin city I. For example, if F1=0.15, F2=0.45 and F3=0.4, for a particular origin city, then after sorting the DFL for that origin city would be shown as F2, F3, F1.

In step 710, the inference computer 130 sets variable counter, DFL counter J, equal to one. The inference computer also sets a variable, fraction accumulator V, equal to zero. The fraction accumulator V represents the sum of historical fractions F retrieved from a destination fraction list for a distinct origin city I. In step 715, the inference computer 130 retrieves the $J^{th}$ historical fraction F from the destination fraction list. Returning to the example in the paragraph above, if J equals one, then the inference computer 130 retrieves F2, which represents the first historical fraction in the sorted DFL. Then, the inference computer 130 adds the value retrieved in step 715 to the fraction accumulator V in step 720.

In step 725 an inquiry is conducted by the inference computer 130 to determine if the fraction accumulator V is greater than or equal to the important city percentile value for the I-th origin city. The important city percentile value typically represents a variable, set by an inventory manager, from a user input terminal 125, above which a destination city K is deemed to be unimportant to origin city I. An important destination city determination typically begins by determining the total number of booked consumers who departed a given origin city and ended in a given destination city (OD number). A destination city percentage is calculated by dividing the OD number by the total number booked consumers departing a given origin city. The destination cities are ranked in descending order based on the destination city percentage. A cumulative percentage of destination city percentages is calculated, beginning with the highest ranked destination city. The destination cities above a predetermined important city percentile are determined to be unimportant destination cities to the origin city. The important city percentile value can be different for different origin cities. In one exemplary embodiment, the system administrator sets the important city percentile value equal to eighty percent (80%) for all origin cities.

If the inference computer 130 determines that V is less than the important city percentile, then the "NO" branch is followed to step 730. In step 730, an inquiry is conducted by the inference computer 130 to determine whether element J is the last element in the destination fraction list for origin city I. If element J is not the last element in the destination fraction list for origin city I, then the "NO" branch is followed to step 735. In step 735, the inference computer 130 increases DFL counter J by one. The process subsequently returns to step 715 for the selection of the next element J in the destination fraction list. If the inference computer 130 determines that element J is the last element of the destination fraction list, then the "YES" branch is followed to step 740.

In step 725, if the inference computer 130 determines that V is greater than or equal to the important city percentile, then the "YES" branch is followed to step 740. In step 740, the inference computer 130 determines the variable, lambda. Typically, lambda is equal to the historical fraction F that was last selected from the destination fraction list. The lambda value can then be stored in memory of the inference computer 130. Returning to our example above, with the important city percentile being set at 80%, the inference computer 130 would select F2 and F3 before reaching a percentage greater than or equal to 80%. Once the inference computer 130 determines, after the selection of F3, that the important city percentile was passed, then lambda is set equal to F3. Lambda represents the importance cut-off point for trips beginning from origin city I. Destination cities with an F greater than or equal to lambda are considered important destination cities for the origin city. Destination cities with an F less than lambda are considered to be unimportant cities for origin city I. In response to the inference computer 130 storing lambda for origin city I, the flow proceeds to step 655 (FIG. 6).

Returning again to FIG. 6, in step 655, an inquiry is made by the inference computer 130 to determine if origin city I is the last origin city in the reservation database 105. If not, the "NO" branch is followed to step 660 and the inference computer increases origin city counter I by one. The process returns to step 610 for the retrieval of the next origin city from the reservation database 105. However, if the inference computer 130 determines that origin city I is the last origin city in the reservation database 105, then the "YES" branch is followed to step 805 (FIG. 8).

Figure 8:
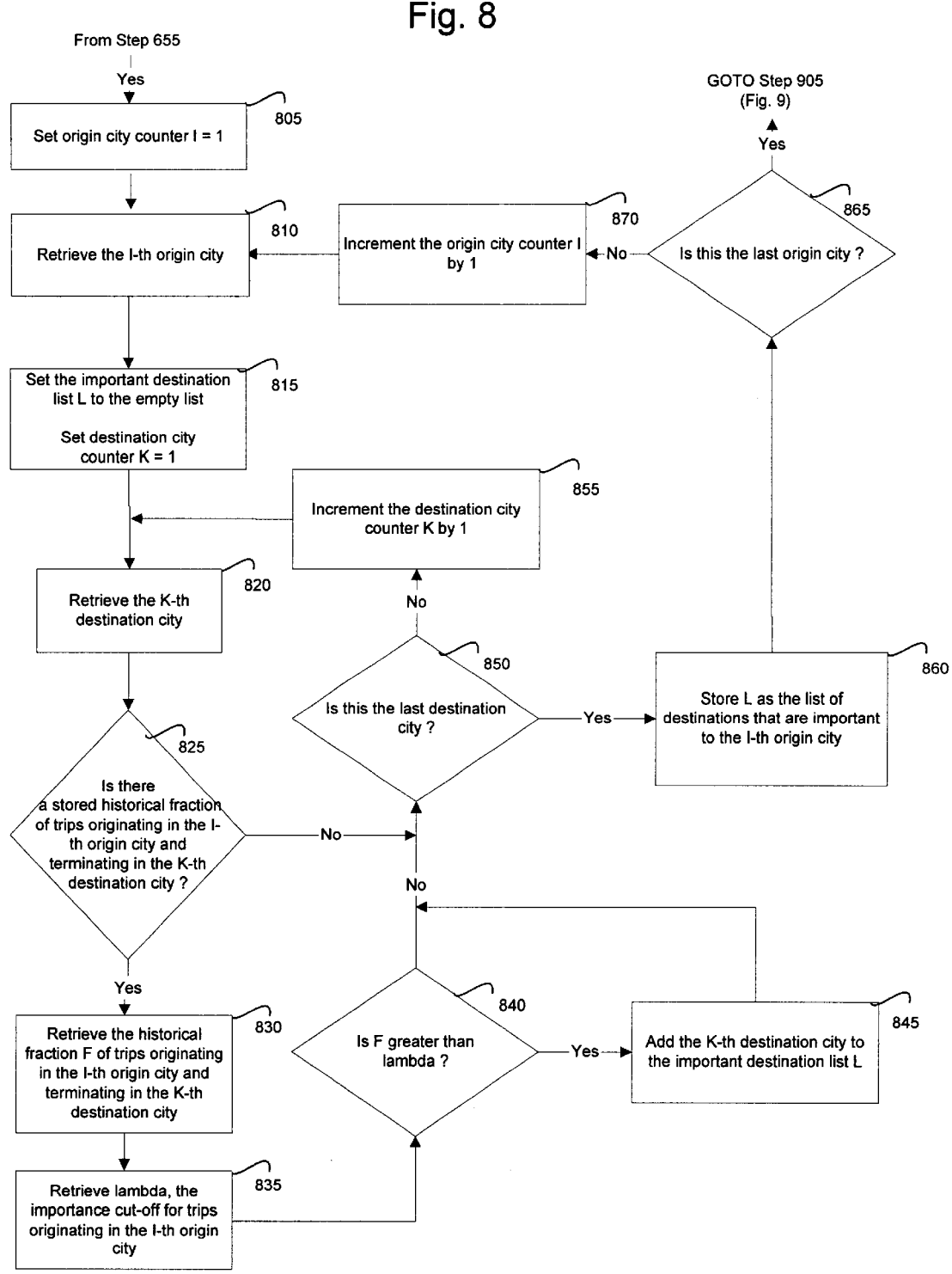

Referring now to FIGS. 1, 2, and 8, in step 805, the inference computer 130 sets the counter variable, origin city counter I, to one. The origin city counter variable represents those cities from which a flight originates or begins its journey. In step 810, the inference computer 130 retrieves origin city I from the reservation database 105. Next, in step 815, the inference computer 130 creates an empty list, denoted important destination list. The inference computer 130 typically uses the important destination list to store the important destination cities for a given origin city I. Then, the inference computer 130 sets destination city counter K equal to one. The variable K represents a selected destination city from a set of all destination cities that receive flights, either non-stop or with stop-overs, from the retrieved origin city. In step 820, the inference computer 130 retrieves destination city K from a set of all destination cities for origin city I, from the reservation database 105.

In step 825, an inquiry is made by the inference computer 130 determining whether a historical fraction F was stored in the inference computer 130 in step 540 for the origin city I-destination city K pair. If so, the "YES" branch is followed to step 830, where the inference computer 130 retrieves the historical fraction F it stored earlier in step 540, for origin city I-destination city K pair. Then, in step 835, the inference computer 130 retrieves the variable, lambda, which was stored on the inference computer 130 in step 740.

In step 840, an inquiry is made determining whether the historical fraction F, retrieved in step 830 is greater than lambda, retrieved in step 835. If the inference computer determines that F is greater than lambda, then the "YES" branch is followed to step 845. In step 845, destination city K is added to the important destination city list for origin city I, created in step 815. Then the process continues to step 850. However, if the inference computer 130 determines F to be less than or equal to lambda, then the "NO" branch is followed to step 850. In step 825, if the inference computer 130 fails to find the historical fraction F for origin city I-destination city K stored in step 540, then the "NO" branch is followed to step 850.

In step 850, an inquiry is made by the inference computer 130 to determine if destination city K is the last destination city for origin city I in the reservation database 105. If not, then the "NO" branch is followed to step 855. In step 855, the inference computer 130 increases destination city counter K by 1. Subsequently, the process returns to step 820 for the retrieval, by the inference computer 130, of the next destination city K for origin city I, from the reservation database 105.

If destination city K is the last destination city for origin city I, then the "YES" branch is followed to step 860. In step 860, the inference computer stores the important destination list L for origin city I. Typically, the important destination list represents the list of destination cities which are important to origin city I. In step 865, an inquiry is made by the inference computer 130 to determine if origin city I is the last origin city in the reservation database 105. If not, the "NO" branch is followed to step 870. In step 870, the inference computer 130 increases origin city counter I by one. The process returns to step 810 for the retrieval of the next origin city from the reservation database 105.

Figure 9:
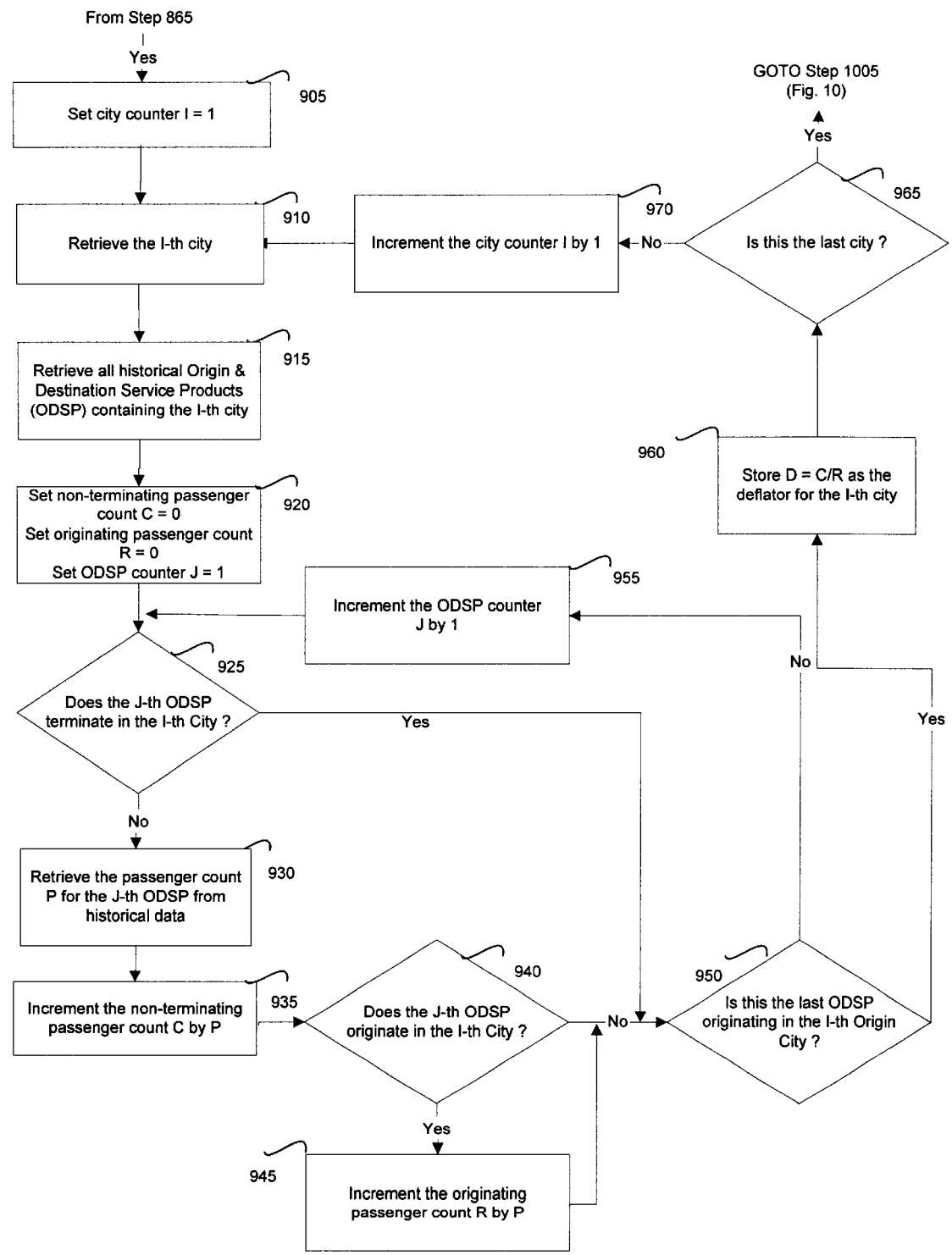

However, if the inference computer 130 determines that origin city I is the last origin city in the reservation database 105, then the "YES" branch is followed to step 905 (FIG. 9).

Referring now to FIGS. 1, 2, and 9, in step 905, the inference computer 130 sets the counter variable, city counter I, equal to one, 905. Next, the origin-destination forecast inference computer 130 retrieves city I, from the reservation database 105, in step 910. In step 915, the inference computer 130 typically retrieves all historical origin-destination service products (ODSP) containing city I, from the reservation database 105. In step 920, non-terminating passenger count C and originating passenger count R are set equal to zero. Furthermore, counter variable, ODSP counter J, is set equal to one, in the inference computer 130. The variable non-terminating passenger count typically represents the number of consumers using a particular origin-destination service product (ODSP), who did not end their travel in city I. The variable, originating passenger count, typically represents the number of consumers using a particular origin-destination service product, whose trip began or originated in city I.

In step 925, an inquiry is made by the inference computer 130 determining if origin-destination service product J terminates, or ends in city I. For example, if city I is Atlanta and the origin-destination service product J is a first class trip from Atlanta to New York, then origin-destination service product J does not terminate in Atlanta, but rather, originates in Atlanta. If ODSP J does terminate in city I, then the "YES" branch is followed to step 950. However, if ODSP J does not terminate in city I, then the "NO" branch is followed to step 930. In step 930, the inference computer 130 retrieves passenger count P, for ODSP J, from historical data stored in the reservation database 105. Next, the inference computer 130 increases the non-terminating passenger count C by the value of passenger count P, in step 935.

In step 940, an inquiry is made by the inference computer 130 determining if origin-destination service product J originated in city I. If ODSP J does not originate in city I, then the "NO" branch is followed to step 950. However, if ODSP J does originate in city I, then the "YES" branch is followed to step 945. In step 945, the inference computer increases the originating passenger count R by passenger count P, retrieved in step 930. Next, the process continues to step 950.

In step 950, an inquiry is conducted to determine whether ODSP J is the last ODSP originating in city I. If ODSP J is not the last ODSP originating in city I, then the "NO" branch is followed to step 955. In step 955, the inference computer 130 increases the ODSP counter J by one. The process subsequently returns to step 925. However, if ODSP J is the last ODSP originating in city I, then the "YES" branch is followed to step 960. In step 960, the inference computer 130 calculates a deflator. The deflator D is typically equal to the non-terminating passenger count C, created in step 935, divided by the originating passenger count R, created in step 945. After calculating the deflator, the inference computer 130 can store the deflator value for later use. The deflator D typically represents the relative mix of originating versus connecting traffic at city I.

In step 965 an inquiry is conducted to determine if city I is the last city in the reservation database 105. If not, the "NO" branch is followed to step 970. In step 970, the inference computer 130 increases city counter I by one. If city I is the last city in the reservation database, then the "YES" branch is followed to step 1005 (FIG. 10).

Figure 10:
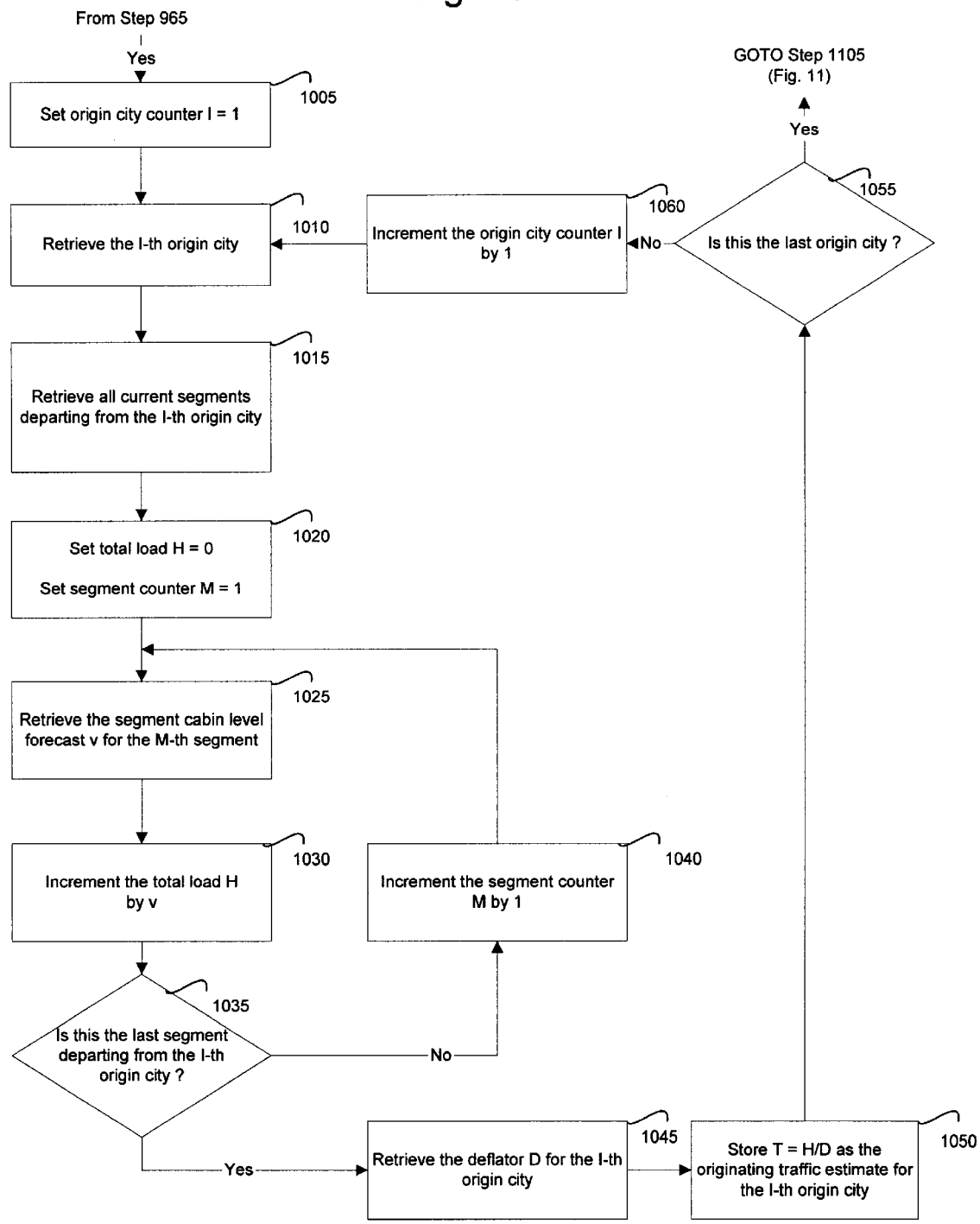

Referring now to FIGS. 1, 2, and 10, in step 1005, the inference computer 130 sets the counter variable, origin city counter I, to one. The origin city counter variable represents those cities from which a flight originates or begins its journey. In step 1010, inference computer 130 retrieves origin city I from the reservation database 105. In step 1015, the inference computer 130 retrieves all current segments departing from origin city I. The current segments can be retrieved from the product preference analysis computer 120. Next, total load H is set equal to zero and segment counter M is set equal to one, in step 1020. Total load H typically represents the total number of consumers forecasted to be originating in or passing through origin city I. Segment counter M typically represents all the segments which begin or originate in origin city I. In step 1025, the inference computer 130 retrieves the segment level unconstrained demand forecast v, for segment M, from the segment level unconstrained demand forecasting computer 115. Then, the inference computer 130 increases the total load H by the value of segment level unconstrained demand forecast v, retrieved in step 1025.

In step 1035, an inquiry is conducted by the inference computer 130 to determine whether segment M is the last segment originating in origin city I. If not, the "NO" branch is followed to step 1040. In step 1040, segment counter M is increased by one. Then the process returns to step 1025 to retrieve the next segment level unconstrained demand forecast v corresponding to segment M. However, if segment M is the last segment retrieved from the product preference analysis computer 120 which departs from origin city I, then the "YES" branch is followed to step 1045. In step 1045, the inference computer 130 retrieves the deflator D stored in step 960, for origin city I. Next, in step 1050, the inference computer 130 calculates the originating traffic estimate for origin city I, T. The originating traffic estimate T typically equals the value of total load H divided by deflator D. Then, the inference computer 130 can store the originating traffic estimate, T, for later use.

In step 1055, an inquiry is made by the inference computer 130 to determine if origin city I is the last origin city in the reservation database 105. If not, the "NO" branch is followed to step 1060. In step 1060, the inference computer 130 increases origin city counter I by one. Next, the process returns to step 1010 for the retrieval of the next origin city from the reservation database 105.

Figure 11:
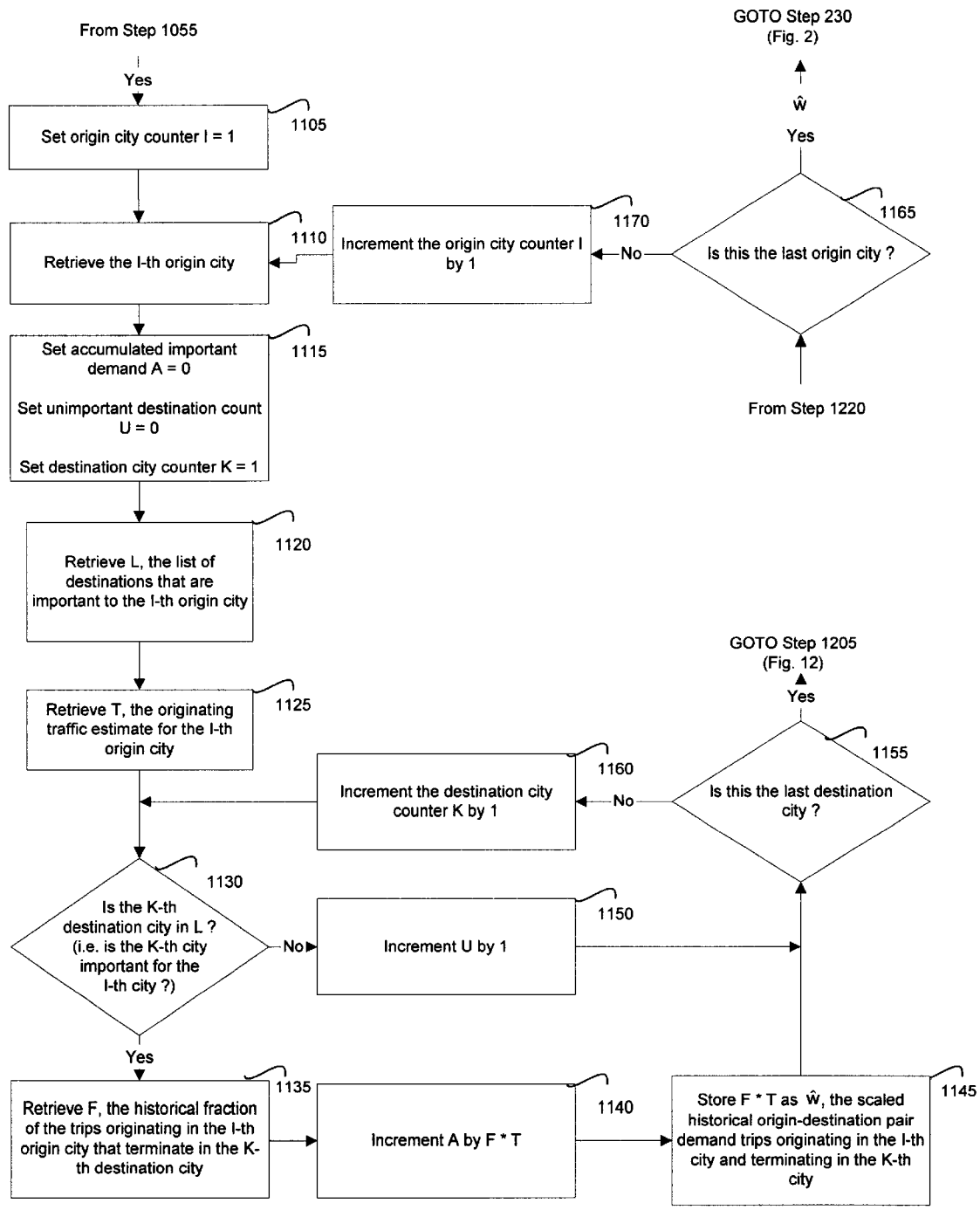

However, if the inference computer 130 determines that origin city I is the last origin city in the reservation database 105, then the "YES" branch is followed to step 1105 (FIG. 11). Referring now to FIGS. 1, 2, and 11, in step 1105, the inference computer 130 sets the counter variable, origin city counter I, to one. The origin city counter variable represents those cities from which a flight originates or begins its journey. In step 1110, inference computer 130 retrieves origin city I from the reservation database 105. In step 1115, the inference computer 130 sets accumulated important demand A equal to zero, unimportant destination count U equal to zero and destination city counter K equal to one. Unimportant destination count U typically represents the number of cities that are not important destination cities for a given origin city. In step 1120 the inference computer 130 retrieves the important destination list L for origin city I, which was created and stored in the memory of the inference computer 130 in step 860 (FIG. 8). Then, in step 1125, the inference computer 130 retrieves originating traffic T for origin city I, created and stored in the inference computer 130 in step 1050 (FIG. 10).

In step 1130, an inquiry is conducted to determine whether destination city K is listed in L, the list of destinations that are important to origin city I. Typically, the inference computer will compare the retrieved destination city K to the list, L. If destination city K is on list L then destination city K is an important destination city for origin city I. If destination city K is not on list L, then the "NO" branch is followed to step 1150. Then, the inference computer 130 increases unimportant destination count U by one. The process continues to step 1155. If destination city K on list L, then the "YES" branch is followed to step 1135. In step 1135, the inference computer 130 retrieves the historical fraction F which was stored in step 540 (FIG. 5). In step 1140, the inference computer increases accumulated important demand A by the product of historical fraction F and originating traffic, T, which were generated and stored in the memory of the inference computer 130 in steps 540 and 1050 respectively. Next, the inference computer 130 stores the value of the product calculated in step 1140 as the scaled historical origin-destination pair demand, w, for origin city I-destination city K pair.

Figure 12:
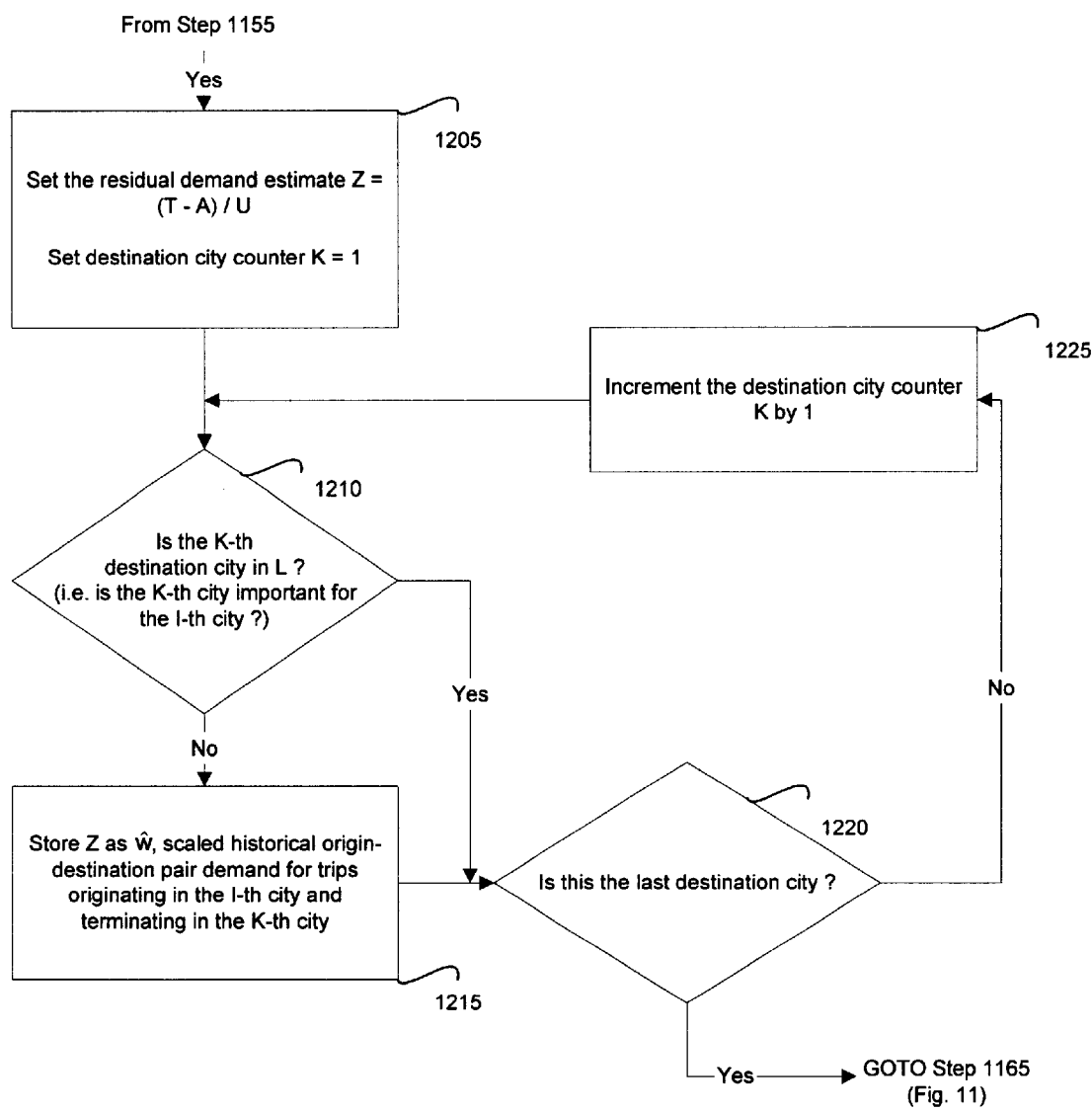

In step 1155, an inquiry is conducted to determine whether destination city K is the last destination city for origin city I. If not, the "NO" branch is followed to step 1160. In step 1160, the inference computer 130 increases destination city counter K by one. Then, the process returns to step 1130. However, if destination city K is the last destination city for origin city I in the reservation database 105, then the "YES" branch is followed to step 1205 (FIG. 12). Referring now to FIGS. 1, 2, and 12, in step 1205, the inference computer 130 sets the counter variable, destination city counter K, equal to one. Furthermore, the inference computer determines the residual demand estimate Z. Typically, the residual demand estimate Z is determined by calculating the difference of originating traffic T and accumulated important demand A, and dividing that difference by unimportant destination count U. Residual demand Z typically represents the evenly divided origin-destination demand remaining for an origin city I after all the origin-destination demands corresponding to important destination cities is removed.

In step 1210, an inquiry is conducted to determine whether destination city K is listed in L, the list of destinations that are important to origin city I. Typically, the inference computer 130 will compare the retrieved destination city K to the list L, which was created and stored in step 860 (FIG. 8). If destination city K is on list L, then destination city K is an important destination city for origin city I. If destination city K is on list L, then the "YES" branch is followed to step 1220. If destination city K is not on list L, then the "NO" branch is followed to step 1215. In step 1215, the inference computer 130 stores the value Z, determined in step 1205, as the scaled historical origin-destination pair demand ŵ for the origin city I-destination city K pair. Then, the process continues to step 1220.

In step 1220, an inquiry is made by the inference computer 130 to determine if destination city K is the last destination city for origin city I in the reservation database 105. If not, then the "NO" branch is followed to step 1225. In step 1225, the inference computer 130 increases destination city counter K by 1. Subsequently, the process returns to step 1210 for the retrieval by the inference computer 130 of the next destination city K, for origin city I, from the reservation database 105.

If destination city K is the last destination city for origin city I, then the "YES" branch is followed to step 1165 (FIG. 11). Returning to FIG. 11, in step 1165, an inquiry is made by the inference computer 130 to determine if origin city I is the last origin city in the reservation database 105. If not, the "NO" branch is followed to step 1170. Then, the inference computer increases origin city counter I by one. Next the process returns to step 1110 for the retrieval of the next origin city from the reservation database 105.

However, if the inference computer 130 determines that origin city I is the last origin city in the reservation database 105, then the "YES" branch is followed to step 230 (FIG. 2), for the computation of estimated origin-destination unconstrained demand, w by the inference computer 130.

Figure 13:
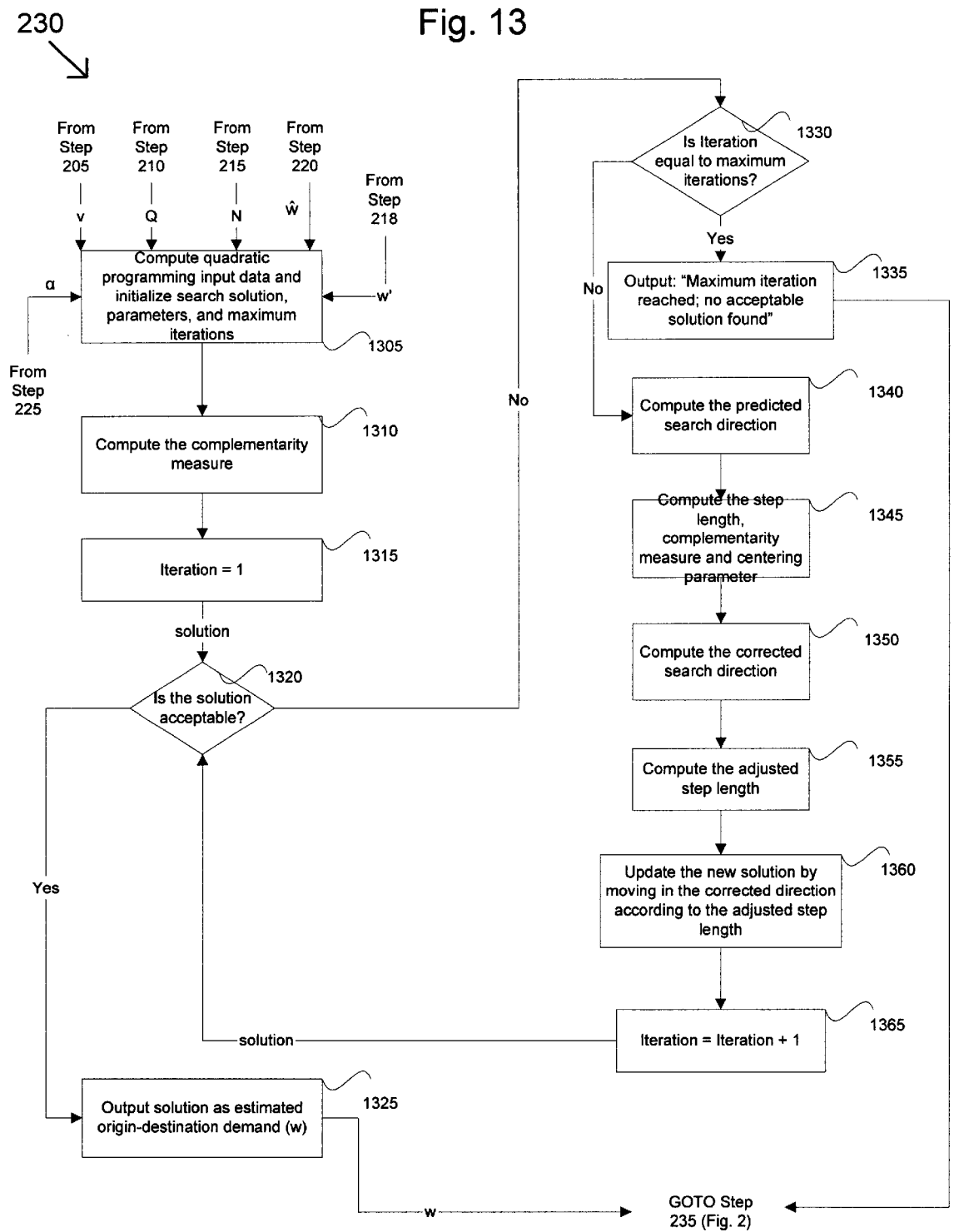
FIG. 13 is a flow chart illustrating a process for computing the Estimated Origin-Destination Unconstrained Demand, w in accordance with an exemplary embodiment of the present invention.

FIG. 13 is a logical flowchart diagram illustrating an exemplary computer-implemented process for completing the determination of estimated origin-destination unconstrained demand task of step 230 (FIG. 2). The computation of step 230 can be supported by the origin-destination forecast inference computer 130. Referencing FIGS. 1, 2, and 13, the process 230 is initiated by accepting the segment level unconstrained demand forecast, consumer preference for origin-destination service products, network flight schedule, and historical origin-destination pair demand from steps 205, 210, 215, and 220, respectively, at the inference computer 130. In one exemplary embodiment, the inference computer 130 also accepts a historical demand adjustment factor from step 225. In another exemplary embodiment, the inference computer 130 accepts a scaled historical origin-destination pair demand from step 220 instead of accepting a historical origin-destination pair demand from step 218.

In step 1305, the accepted data is input by the inference computer 130, into a quadratic program solver in the inference computer 130. A maximum number of iterations is selected, solution parameters are selected, and a search solution is initialized. In one exemplary embodiment the quadratic program solver inputs the data into the following equation:

$$\min \|NQ^T w - v\|^2 + \alpha \|w - w'\|^2$$

subject to $w \geq 0$,
with T representing the transpose of consumer preference for origin-destination service products Q. Then, the solver computes the complementarity measure in step 1310. In step 1315, the quadratic program solver sets iteration count equal to one. The iteration count represents the number of times the quadratic program solver attempts to deliver an acceptable solution. Typically, a solution is acceptable when it satisfies the parameters input into the solver by the inference computer in step 1305.

In step 1320, an inquiry is conducted to determine whether the solution is acceptable based on the chosen parameters. If so, the "YES" branch is followed to step 1325. In step 1325, the solution is output from the quadratic program solver to the inference computer 130 as estimated origin-destination unconstrained demand w Then, the process continues to step 235 (FIG. 2) for the determination of estimated origin-destination service product unconstrained demand.

If the solution is not acceptable, then the "NO" branch is followed to step 1330. In step 1330, an inquiry is conducted by the quadratic program solver to determine whether the iteration count is equal to a maximum number of iterations chosen in step 1305. If so, the "YES" branch is followed to step 1335. In step 1335, the quadratic program solver outputs a message to the inference computer 130 that the maximum number of iterations has been reached and no acceptable solution was found. Subsequently, the process continues to step 235 (FIG. 2).

If iteration is not equal to the maximum number of iterations, then the "NO" branch is followed to step 1340. In step 1340, the quadratic program solver determines the predicted search direction adjustment to find a better solution. Then, the quadratic program solver computes the step length, complementarity measure, and centering solution in step 1345. In step 1350, the solver computes the corrected search direction for the next solution. In step 1355, the solver determines the adjusted step length for the next solution. Then, in step 1360, the solver moves the prior solution in the corrected direction according to the adjusted step length, in accordance with the determinations of steps 1340–1355. Next, the value of iteration is increased by one, in step 1365. The process then returns to step 1340, where an inquiry is made to determine whether the new solution is an acceptable solution based on the selected parameters.

Typically, the quadratic program solver continues in a similar loop until either an acceptable solution is found, 1345, or the maximum number of iterations is reached, 1355, at which point the process is continued to step 235 (FIG. 2).

Figure 14:
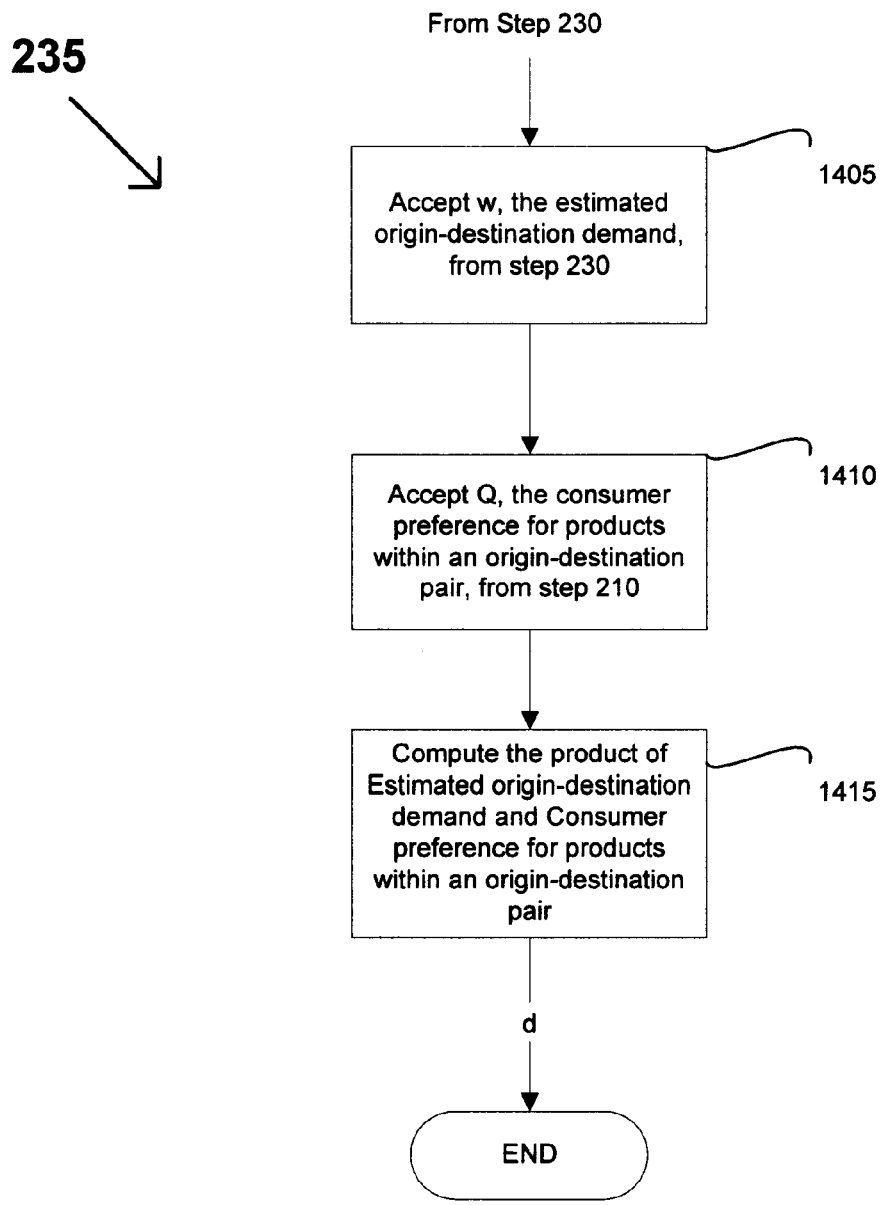
FIG. 14 is a flow chart illustrating a process for computing the Estimated Origin-Destination Service Product Unconstrained Demand, d, in accordance with an exemplary embodiment of the present invention.

FIG. 14 is a logical flowchart diagram illustrating an exemplary computer-implemented process for completing the computation of the estimated origin-destination service product unconstrained demand task of step 235 (FIG. 2). The demand is denoted an unconstrained demand because it typically includes the number of consumers who will book a flight from the origin city to the destination city and those consumers who were denied an opportunity to book a flight or chose not to book a flight. A consumer's reasons include: the flight was full, the price charged for the flight was too high, their product choice was unavailable, non-stop flights were unavailable, etc. Those skilled in the art will recognize a wide range of other reasons exist for why a consumer would be denied an opportunity to book a flight or would chose not to book a flight. The computation of step 235 is typically supported by the inference computer 130. Referencing FIGS. 1, 2, and 14, the process 235 is initiated in step 1405, with the inference computer 130 accepting the estimated origin-destination unconstrained demand w from step 230. In step 1410, the inference computer 130 accepts consumer preference for origin-destination service products Q from step 210. The determination of the consumer preference for origin-destination service products Q typically takes place in the product preference analysis computer, 120. In step 1415, the inference computer uses the estimated origin-destination unconstrained demand w and the consumer preference for origin-destination service products Q to determine the estimated origin-destination service product unconstrained demand d. In one exemplary embodiment the determination of estimated origin-destination service product unconstrained demand, d, is accomplished using the following formula: $d=Q^T w$; where Q represents a matrix of consumer preference for origin-destination service products, w represents estimated origin-destination unconstrained demand, and T represents the transpose of matrix Q. The estimated origin-destination service product unconstrained demand, d, can then be output to a user input terminal, 125. The process 235 then terminates at the END step.

In view of the foregoing it will be understood that an aspect of the present invention is to work cohesively with existing reservation and forecasting systems in the collection of necessary inputs so as to avoid the implementation of redundant systems.

Another aspect of the present invention is to use consumer product preference based on the current flight schedule and available products in the determination of the estimated origin-destination service product unconstrained passenger demand.

Another aspect of the present invention is to provide the inventory manager with the ability to control the overall importance of historical origin-destination level observed passenger demand as compared to segment level unconstrained passenger demand forecasts in the determination of origin-destination level unconstrained passenger demand.

Another aspect of the present invention is to modify the historical demand for an origin-destination pair in a way which provides a more precise estimation of origin-destination product unconstrained service demand.

Yet another aspect of the present invention is the use of a least squares based forecast inference system to produce an estimated origin-destination unconstrained service product level demand forecast by using segment level service product demand forecasts and historical passenger name record data.

No particular programming language has been described for carrying out the various procedures described above. It is considered that the operations, steps, and procedures described above and illustrated in the accompanying drawings are sufficiently disclosed to enable one of ordinary skill in the art to practice the present invention. However, there are many computers, operating systems, and application programs which may be used in practicing an exemplary embodiment of the present invention. Each user of a particular computer will be aware of the language and tools which are most useful for that user's needs and purposes. In addition, although the invention was described in the context of a consumer aviation industry application, those skilled in the art will appreciate that the invention can be extended to a wide variety of travel industries. It should be understood that the foregoing related only to specific embodiments of the present invention, and that numerous changes may be made therein without departing from the spirit and scope of the invention as defined by the following claims.

We claim:

1. A method for determining an estimated origin-destination service product unconstrained demand, comprising the steps of:

retrieving a segment level unconstrained demand forecast for each flight segment within an origin-destination pair, wherein the flight segment comprises a segment having a single take-off and a single landing for an aircraft;

generating with a computer processor a consumer preference for origin-destination service products;

generating with the computer processor a network flight schedule by determining which available service products use one of the flight segments based on the segment level unconstrained demand forecast and the consumer preference for origin-destination service products, wherein the network flight schedule comprises a determination whether a service product uses a particular flight segment;

retrieving a historical origin-destination pair demand;

receiving a historical demand adjustment factor, wherein the historical demand adjustment factor is greater than 1 if a historical demand level is given greater weight than the segment level unconstrained demand forecast;

determining an estimated origin-destination unconstrained demand based on the segment level unconstrained demand forecast, the historical origin-destination pair demand, the network flight schedule, the consumer preference for origin-destination service products within the origin-destination pair, and the historical demand adjustment factor; and computing the estimated origin-destination service product unconstrained demand based on the estimated origin-destination unconstrained demand and the consumer preference for origin-destination service products.

2. The method of claim 1, wherein the historical demand adjustment factor is equal to 0.1.

3. The method of claim 1, where the historical demand adjustment factor is less than 1 and greater than 0 if a historical demand level is given less weight as compared to the segment level unconstrained demand forecast.

4. The method of claim 1, wherein the historical origin-destination pair demand comprises a scaled historical origin-destination pair demand.

5. The method of claim 4, further comprising the step of generating the scaled historical origin-destination pair demand by:

retrieving an origin city for the origin-destination pair;

retrieving a destination city for the origin-destination pair;

determining if the destination city is an important destination city by identifying a percentage of consumers who begin at the origin city and end at the destination city as compared to all consumers beginning at the origin city;

generating with the computer processor a deflator for the origin city by dividing a non-terminating passenger count by an originating passenger count;

generating an estimated total traffic originating in the origin city by dividing a total load by the deflator;

generating with the computer processor the scaled historical origin-destination pair demand for the important city by calculating the product of the estimated total traffic originating in the origin city and the percentage of the consumers who begin at the origin city and end at the destination city;

generating with the computer processor used demand by summing the scaled historical origin-destination pair demand for each of the important cities;

generating an uncounted destination cities by summing the number of unimportant cities; and determining the scaled historical origin-destination pair demand for the unimportant cities by calculating the difference between estimated total traffic and used demand and dividing the difference by the uncounted destination cities.

6. The method of claim 5, wherein the destination city is an important destination city if the destination city is within the 80th percentile of total booked passengers departing the origin city.

7. The method of claim 1, wherein the step of computing an estimated origin-destination service product unconstrained demand comprises the steps of:

determining the available service products within the origin-destination pair;

computing the percentage of consumers who have historically used each of the available service products; and computing with the computer processor the estimated origin-destination service product unconstrained demand by calculating the product of the estimated origin-destination unconstrained demand and the percentage of consumers who have historically used each of the available service products.

8. The method of claim 1, wherein the step of generating the network flight schedule comprises the steps of:

retrieving one of the flight segments from a flight segment list;

retrieving a service product from a service product list;

determining with the computer processor if the flight segment is used by the service product;

placing a 1 in a position representing the flight segment and the service product in the network flight schedule matrix if the flight segment is used by the service product;

placing a 0 in the position representing the flight segment and the service product in the network flight schedule matrix if the flight segment is not used by the service product.

9. A method for determining an estimated origin-destination service product unconstrained demand (d), comprising the steps of:

retrieving a segment level unconstrained demand forecast (v);

retrieving a consumer preference for origin-destination service products (Q);

generating with a computer processor a network flight schedule (N) by determining if a flight segment is included in a service product;

retrieving a historical origin-destination pair demand (w');

determining with the computer processor an estimated origin-destination unconstrained demand (w) using the formula $$\min \|NQ^T w - v\|^2 + \|w - w'\|^2; \text{ and}$$

subject to $w \geq 0$, generating with the computer processor an estimated origin-destination service product unconstrained demand (d) using the formula $$d = Q^T w.$$

10. The method of claim 9, wherein the determining step comprises the steps of:

inputting the historical demand adjustment factor ($\alpha$); and generating with the computer processor the estimated origin-destination unconstrained demand (w), using the formula $$\min \|NQ^T w - v\|^2 + \alpha \|w - w'\|^2$$

subject to $w \geq 0$.

11. The method of claim 10, wherein the historical demand adjustment factor ($\alpha$) is 0.1.

12. The method of claim 10, wherein the historical demand adjustment factor ($\alpha$) is greater than 1 if a historical demand level is given a greater weight than the segment level unconstrained demand forecast (v).

13. The method of claim 10, wherein the historical demand adjustment factor ($\alpha$) is less than 1 and greater than 0 if a historical demand level is given less weight as compared to the segment level unconstrained demand forecast (v).

14. The method of claim 9, wherein the historical origin-destination pair demand (w') comprises a scaled historical origin-destination pair demand ($\hat{w}$), and determining the scaled historical origin-destination pair demand ($\hat{w}$) comprises the steps of:

retrieving an origin city for the origin-destination pair;

retrieving a destination city for the origin-destination pair;

determining if the destination city is an important destination city by identifying a percentage of consumers who begin at the origin city and end at the destination city as compared to all consumers beginning at the origin city;

generating with the computer processor a deflator for the origin city by dividing a non-terminating passenger count by an originating passenger count;

generating with the computer processor an estimated total traffic originating in the origin city by dividing a total load by the deflator;

generating with the computer processor the scaled historical origin-destination pair demand ($\hat{w}$) for the important city by calculating the product of the estimated total traffic originating in the origin city and the percentage of the consumers who begin at the origin city and end at the destination city;

generating with the computer processor used demand by summing the scaled historical origin-destination pair demand (ŵ) for each of the important cities;

generating with the computer processor an uncounted destination cities by summing to number of unimportant cities; and determining with the computer processor the scaled historical origin-destination pair demand (ŵ) for the unimportant cities by calculating the difference between estimated total traffic and used demand and dividing the difference by the uncounted destination cities.

15. The method of claim 14, wherein the destination city is an important destination city if the destination city is within the 80$^{th}$ percentile of total booked passengers departing the origin city.

16. The method of claim 9, wherein the step of computing an estimated origin-destination service product unconstrained demand (d) comprises the steps of:

determining the available service products within the origin-destination pair;

computing with the computer processor the percentage of consumers who have historically used each of the available service products; and computing with the computer processor the estimated origin-destination service product unconstrained demand (d) by calculating the product of the estimated origin-destination unconstrained demand (w) and the percentage of consumers who have historically used each of the available service products.

17. The method of claim 9, wherein the step of generating the network flight schedule (N) comprises the steps of:

retrieving one of the flight segments from a flight segment list;

retrieving a service product from a service product list;

determining with the computer processor if the flight segment is used by the service product;

placing a 1 in the position representing the flight segment and the service product in the network flight schedule (N) matrix if the flight segment is used by the service product;

placing a 0 in the position representing the flight segment and the service product in the network flight schedule (N) matrix if the flight segment is not used by the service product.

18. A method for determining an estimated origin-destination service product unconstrained demand (d), comprising the steps of:

inputting a segment level unconstrained demand forecast (v);

inputting a consumer preference for products within an origin-destination pair (Q);

inputting a historical origin-destination pair demand (w');

generating with a computer processor a network flight schedule (N) by determining if a flight segment is included in a service product;

determining with the computer processor an estimated origin-destination unconstrained demand (w) using the formula $$\min \|NQ^Tw-v\|^2 + \|w-w'\|^2; \text{ and}$$

subject to $w \geq 0$, generating with the computer processor an estimated origin-destination service product unconstrained demand (d) using the formula $$d = Q^Tw.$$

19. The method of claim 18, wherein the determining step comprises the steps of;

inputting a historical demand adjustment factor ($\alpha$); and generating with the computer processor an estimated origin-destination unconstrained demand (w), using the formula $$\min \|NQ^Tw-v\|^2 + \alpha\|w-w'\|^2$$

subject to $w \geq 0$.

20. The method of claim 19, wherein the historical demand adjustment factor ($\alpha$) is 0.1.

21. The method of claim 19, wherein the historical demand adjustment factor ($\alpha$) is greater than 1 if a historical demand level is given a greater weight than the segment level unconstrained demand forecast (v).

22. The method of claim 19, wherein the historical demand adjustment factor ($\alpha$) is less than 1 and greater than 0 if a historical demand level is given less weight as compared to the segment level unconstrained demand forecast (v).

23. The method of claim 18, wherein the historical origin-destination pair demand (w') comprises a scaled historical origin-destination pair demand (ŵ).

24. The method of claim 23, further comprising the step of generating scaled historical origin-destination pair demand (ŵ) by:

retrieving an origin city for the origin-destination pair;

retrieving a destination city for the origin-destination pair;

determining if the destination city is an important destination city by identifying a percentage of consumers who begin at the origin city and end at the destination city compared to all consumers beginning at the origin city;

generating with the computer processor a deflator for the origin city by dividing a non-terminating passenger count by an originating passenger count;

generating with the computer processor an estimated total traffic originating in the origin city by dividing a total load by the deflator;

generating with the computer processor the scaled historical origin-destination pair demand (ŵ) for the important city by calculating the product of the estimated total traffic originating in the origin city and the percentage of the consumers who begin at the origin city and end at the destination city;

generating used demand by summing the scaled historical origin-destination pair demands (ŵ) for each of the important cities;

generating with the computer processor an uncounted destination cities by summing the number of unimportant cities; and determining with the computer processor the scaled historical origin-destination pair demand (ŵ) for the unimportant cities by taking the difference between the estimated total traffic and the used demand and dividing the difference by the uncounted destination cities.

25. The method of claim 24, wherein the destination city is an important destination city if the destination city is within the 80$^{th}$ percentile of total booked passengers departing the origin city.

26. The method of claim 18, wherein the step of computing an estimated origin-destination service product unconstrained demand (d) comprises the steps of:

determining the available service products within the origin-destination pair;

computing the percentage of consumers who have historically used each of the available service products; and computing with the computer processor the estimated origin-destination service product unconstrained demand (d) by calculating the product of to estimated origin-destination unconstrained demand (w) and percentage of consumers who have historically used each of the available service products.

27. The method of claim 18, wherein the network flight schedule (N) comprises the steps of:

retrieving one of the flight segments from a flight segment list;

retrieving a service product from a service product list;

determining with the computer processor if the flight segment is used by the service product;

placing a 1 in the position representing die flight segment and the service product in the network flight schedule (N) matrix if the flight segment is used by the service product;

placing a 0 in the position representing the flight segment and the service product in the network flight schedule (N) matrix if the flight segment is not used by the service product.

28. A computer-readable medium for determining an estimated origin-destination service product unconstrained demand, said medium having computer-executable instructions for performing the steps comprising:

receiving a segment level unconstrained demand forecast for each flight segment within an origin-destination pair, wherein the flight segment comprises a segment having a single take-off and a single landing for an aircraft;

generating a consumer preference for origin-destination service products within the origin-destination pair;

generating a network flight schedule, wherein the network flight schedule comprises a determination whether a service product uses a particular flight segment;

receiving a historical origin-destination pair demand;

receiving a historical demand adjustment factor, wherein the historical demand adjustment factor is greater than 1 if a historical demand level is given greater weight than the segment level unconstrained demand forecast;

determining an estimated origin-destination unconstrained demand based on the segment level unconstrained demand forecast, the historical origin-destination pair demand, the network flight schedule, the consumer preference for origin-destination service products within the origin-destination pair, and the historical demand adjustment factor; and computing the estimated origin-destination service product unconstrained demand.

29. A computer-readable medium for determining an estimated origin-destination service product unconstrained demand, said medium having computer-executable instructions for performing the steps comprising:

receiving a segment level unconstrained demand forecast for each flight segment within an origin-destination pair, wherein the flight segment comprises a segment having a single take-off and a single landing for an aircraft;

generating a consumer preference for origin-destination service products within the origin-destination pair;

generating a network flight schedule, wherein the network flight schedule comprises a determination whether a service product uses a particular flight segment;

receiving a historical origin-destination pair demand;

receiving a historical demand adjustment factor, wherein the historical demand adjustment factor is less than 1 and greater than 0 if a historical demand level is given less weight as compared to the segment level unconstrained demand forecast;

determining an estimated origin-destination unconstrained demand based on the segment level unconstrained demand forecast, the historical origin-destination pair demand, the network flight schedule, the consumer preference for origin-destination service products within the origin-destination pair, and the historical demand adjustment factor; and computing the estimated origin-destination service product unconstrained demand.

* * * * *